United States Patent
Lin

(10) Patent No.: US 12,481,713 B2
(45) Date of Patent: Nov. 25, 2025

(54) SEARCH CONTENT SHARING METHOD AND APPARATUS, AND COMPUTER DEVICE, AND STORAGE MEDIUM

(71) Applicant: TENCENT TECHNOLOGY (SHENZHEN) COMPANY LIMITED, Shenzhen (CN)

(72) Inventor: Zhiyuan Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/336,112

(22) Filed: Jun. 16, 2023

(65) Prior Publication Data
US 2023/0325449 A1     Oct. 12, 2023

Related U.S. Application Data

(63) Continuation of application No. PCT/CN2022/131661, filed on Nov. 14, 2022.

(30) Foreign Application Priority Data

Feb. 21, 2022   (CN) .......................... 202210158417.5

(51) Int. Cl.
*G06F 16/00*     (2019.01)
*G06F 16/2455*   (2019.01)
(Continued)

(52) U.S. Cl.
CPC .... *G06F 16/9538* (2019.01); *G06F 16/24565* (2019.01); *G06F 16/9535* (2019.01)

(58) Field of Classification Search
CPC .......... G06F 16/9538; G06F 16/24565; G06F 16/9535
See application file for complete search history.

(56) References Cited

U.S. PATENT DOCUMENTS

2006/0294189 A1   12/2006   Natarajan et al.
2007/0136477 A1    6/2007   Bryce et al.
(Continued)

FOREIGN PATENT DOCUMENTS

CN    102810103 A    12/2012
CN    105095426 A    11/2015
(Continued)

OTHER PUBLICATIONS

The World Intellectual Property Organization (WIPO) International Search Report for PCT/CN2022/131661 Jan. 17, 2023 12 Pages (including translation).
(Continued)

*Primary Examiner* — Khanh B Pham
(74) *Attorney, Agent, or Firm* — Anova Law Group, PLLC

(57) ABSTRACT

A search content sharing method includes: receiving a message transmitted by a first client, the message including a target search content, and the target search content being from a target search content of at least one search content that is searched by the first client and associated with search information; displaying the target search content and a search identifier corresponding to the target search content in a session page of a second client, the search identifier being used for identifying source information of the target search content; and displaying the source information corresponding to the target search content in response to a trigger operation for the search identifier, the source information including the at least one search content searched by the first client based on the search information.

18 Claims, 21 Drawing Sheets

---

Receive a message transmitted by a first client, where the message includes a target search content, and the target search content is from at least one search content that is searched by the first client and associated with search information — 201

Display the target search content and a search identifier corresponding to the target search content in a session page of a second client, where the search identifier is used for identifying source information of the target search content — 202

Display the source information corresponding to the target search content in response to a trigger operation for the search identifier, where the source information includes at least one search content searched by the first client based on the search information — 203

(51) Int. Cl.
*G06F 16/9535* (2019.01)
*G06F 16/9538* (2019.01)

(56) References Cited

U.S. PATENT DOCUMENTS

| | | |
|---|---|---|
| 2008/0162438 A1 | 7/2008 | Szeto et al. |
| 2012/0185465 A1 | 7/2012 | Lucovsky et al. |
| 2012/0290603 A1* | 11/2012 | Ickman ............... G06F 16/9538 707/769 |
| 2013/0275860 A1* | 10/2013 | Tran ..................... G06F 16/248 715/234 |
| 2014/0136505 A1* | 5/2014 | Satalkar ............. G06F 16/9538 707/706 |
| 2016/0330150 A1 | 11/2016 | Joe et al. |
| 2018/0067940 A1* | 3/2018 | Shin ................. G06F 16/90335 |
| 2018/0246983 A1 | 8/2018 | Rathod |
| 2022/0222304 A1* | 7/2022 | Chung .............. G06F 16/90324 |

FOREIGN PATENT DOCUMENTS

| | | |
|---|---|---|
| CN | 105100141 A | 11/2015 |
| CN | 106126514 A | 11/2016 |
| CN | 108038165 A | 5/2018 |
| CN | 109885751 A | 6/2019 |
| CN | 112989168 A | 6/2021 |
| JP | 2006317997 A | 11/2006 |
| JP | 2007534083 A | 11/2007 |
| JP | 2008547113 A | 12/2008 |
| JP | 2016212860 A | 12/2016 |

OTHER PUBLICATIONS

The Japan Patent Office (JPO) Notice of Reasons for Refusal for Application No. 2024-531242 Apr. 30, 2025 7 Pages (including translation).

China National Intellectual Property Administration (CNIPA) Office Action 1 for Application No. 202210158417.Oct. 5, 11, 2025 10 Pages (including translation).

* cited by examiner

SEARCH CONTENT SHARING METHOD AND APPARATUS, AND COMPUTER DEVICE, AND STORAGE MEDIUM

RELATED APPLICATION(S)

This application is a continuation application of PCT Patent Application No. PCT/CN2022/131661 filed on Nov. 14, 2022, which claims priority of Chinese Patent Application No. 202210158417.5, filed with the China National Intellectual Property Administration on Feb. 21, 2022, and entitled "SEARCH CONTENT SHARING METHOD AND APPARATUS, AND COMPUTER DEVICE", all of which incorporated herein by reference in entirety.

FIELD OF THE TECHNOLOGY

The present disclosure relates to the technical field of computer technologies, and in particular, to a search content sharing method and apparatus, and a computing device, and a storage medium.

BACKGROUND

With the development of the information technology and Internet technology, various functions have been derived from a computing device, such as a search function. Through the search function on the computing device, related search contents may be quickly searched. However, it has been found that an existing search function generally desires an object to input related search information, the computing device searches related search contents based on the search information, and the searched search contents often may not be shared with other objects. That is, in certain existing technology, the search content may not be shared, so that other objects may not directly acquire source information of the search content.

SUMMARY

According to various embodiments provided by the present disclosure, a search content sharing method and apparatus, a computing device, and a storage medium are provided.

The present disclosure in one aspect provides a search content sharing method, performed by a computing device, the method including:
  receiving a message transmitted by a first client, where the message includes a target search content, and the target search content is from at least one search content that is searched by the first client and associated with search information;
  displaying the target search content and a search identifier corresponding to the target search content in a session page of a second client, where the search identifier is used for identifying source information of the target search content; and
  displaying the source information corresponding to the target search content in response to a trigger operation for the search identifier, the source information including the at least one search content searched by the first client based on the search information.

The present disclosure in another aspect provides a search content sharing apparatus, including: a memory storing computer program instructions; and a processor coupled to the memory and configured to execute the computer program instructions and perform: receiving a message transmitted by a first client, where the message includes a target search content, and the target search content is from at least one search content that is searched by the first client and associated with search information; displaying the target search content and a search identifier corresponding to the target search content in a session page of a second client, where the search identifier is used for identifying source information of the target search content; and displaying the source information corresponding to the target search content in response to a trigger operation for the search identifier, the source information including the at least one search content searched by the first client based on the search information.

The present disclosure in yet another aspect provides a search content sharing method, performed by a computing device, the method including:
  displaying a search result page of a first client, where the search result page includes a search result searched based on search information, and the search result includes at least one search content; and
  transmitting a message to a second client in response to a transmitting operation for a target search content of the at least one search content, where the message instructs the second client to display the target search content and a search identifier corresponding to the target search content in a session page after receiving the message, and the search identifier is used for identifying source information of the target search content.

The present disclosure in yet another aspect provides a search content sharing apparatus, including: a memory storing computer program instructions; and a processor coupled to the memory and configured to execute the computer program instructions and perform: displaying a search result page of a first client, where the search result page includes a search result searched based on search information, and the search result includes at least one search content; and transmitting a message to a second client in response to a transmitting operation for a target search content of the at least one search content, where the message instructs the second client to display the target search content and a search identifier corresponding to the target search content in a session page after receiving the message, and the search identifier is used for identifying source information of the target search content.

A computing device includes a memory and one or more processors, where the memory has a computer-readable instruction stored thereon that when executed by the processors, causing the one or more processors to perform the steps in the search content sharing method.

One or more non-transitory readable storage media has a computer-readable instruction stored thereon that when executed by one or more processors, causing the one or more processors to implement the steps in the search content sharing method.

A computer program product includes a computer-readable instruction that when executed by a processor, causing the steps in the search content sharing method to be implemented.

Other aspects of the present disclosure may be understood by those skilled in the art in light of the description, the claims, and the drawings of the present disclosure.

Details of one or more embodiments of the present disclosure are provided in the following accompanying drawings and descriptions. Other features, objectives, and advantages of the present disclosure become apparent from the present disclosure, the drawings, and the claims.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
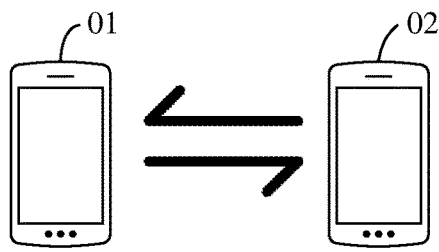
FIG. 1 is a schematic diagram of a scenario of a search content sharing method according to certain embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of embodiments. When and as applicable, the term "an embodiment," "one embodiment," "some embodiment(s), "some embodiments," "certain embodiment(s)," or "certain embodiments" may refer to the same subset or different subsets of embodiments, and may be combined with each other without conflict.

In certain embodiments, the term "based on" is employed herein interchangeably with the term "according to."

An embodiment of the present disclosure provides a search content sharing method and apparatus, a computing device, and a storage medium.

An embodiment of the present disclosure provides a search content sharing system, including: a search content sharing apparatus suitable for a first client (which may be referred to as a first search content sharing apparatus) and a search content sharing apparatus suitable for a second client (which may be referred to as a second search content sharing apparatus).

The first search content sharing apparatus may be integrated in a computing device, and the second search content sharing apparatus may also be integrated in a computing device. The computing device may include at least one of a terminal, and a server and the like. That is, the search content sharing method provided by the embodiments of the present disclosure may be performed by the terminal, may be performed by the server, or may be performed jointly by the terminal and the server which may communicate with each other.

The terminal may be a terminal device such as a smart phone, a tablet computer, a notebook computer, a personal computer (PC), smart appliances, a wearable electronic device, a VR/AR device and an in-vehicle computer. The terminal device may further include a client. The client may be a game application client, a browser client carrying a game program, or an instant messaging client, etc.

The server may be an interworking server between a plurality of heterogeneous systems or a back-end server, may be an independent physical server, may be a server cluster composed of a plurality of physical servers or a distributed system, or may be a cloud server that provides cloud services, cloud databases, cloud computing, cloud functions, cloud storage, network services, cloud communication, middleware services, domain name services, security services, and cloud computing services such as big data and artificial intelligence platforms.

For example, as shown in FIG. 1, a first search content sharing apparatus may be integrated in a first terminal 01, and may be configured to display a search result page of a first client, where the search result page includes a search result searched based on search information, and the search result includes at least one search content; and transmit a message to a second client in response to a transmitting operation for a target search content of the at least one search content, where the message instructs the second client to display the target search content and a search identifier corresponding to the target search content in a session page after receiving the message, and the search identifier is used for identifying source information of the target search content.

In addition, as shown in FIG. 1, a second search content sharing apparatus may be integrated in a second terminal 02, and may be configured to receive a message transmitted by a first client, where the message includes a target search content, and the target search content is from at least one search content searched by the first client and associated with search information; display the target search content and a search identifier corresponding to the target search content in a session page of the second client, where the search identifier is used for identifying source information of the target search content; and display the source information corresponding to the target search content in response to a trigger operation for the search identifier, where the source information includes the at least one search content searched by the first client based on the search information.

In some embodiments, the search content sharing system includes a message transmission apparatus in addition to the first search content sharing apparatus and the second search content sharing apparatus. For example, the first search content sharing apparatus may be integrated in a first terminal, the second search content sharing apparatus may be integrated in a second terminal, and the message transmission apparatus may be integrated in a server. The target search content searched by the first client in the first terminal may be transmitted to the second client in the second terminal through the server, so that the target search content may be shared between the first client and the second client. The first search content sharing apparatus and the message transmission apparatus may be connected through a network, for example, through a wired or a wireless network. Similarly, the second search content sharing apparatus and the message transmission apparatus may alternatively be connected through a network, for example, through a wired or a wireless network.

Detailed descriptions are separately provided below. The description order of the following embodiments is not intended to limit the order of the embodiments.

Embodiments of the present disclosure will be described from the perspective of a first search content sharing apparatus. The first search content sharing apparatus may be integrated in a computing device. The computing device may be a server or may be a device such as a terminal.

Figure 2:
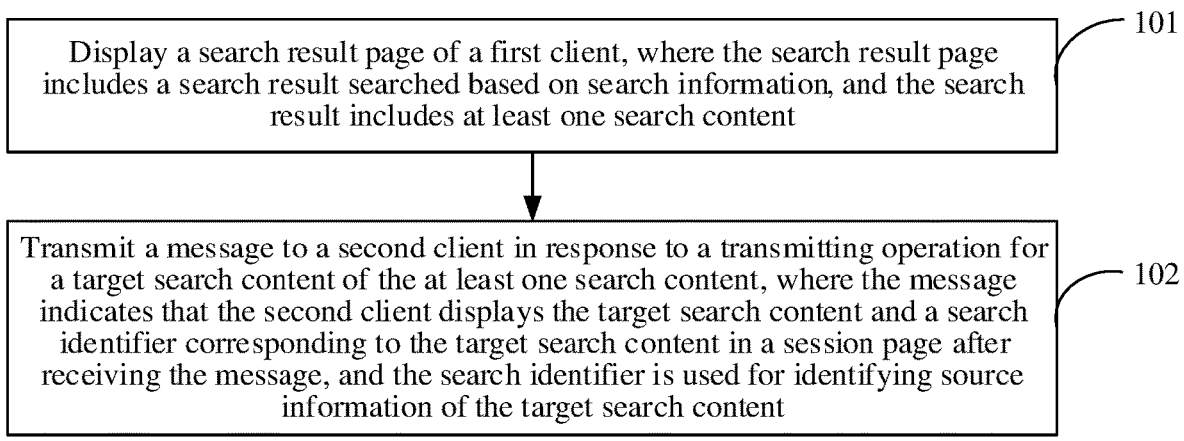
FIG. 2 is a schematic flowchart of a search content sharing method according to certain embodiment(s) of the present disclosure.

As shown in FIG. 2, a search content sharing method is provided and includes the following specific process:

101: displaying a search result page of a first client, where the search result page includes a search result searched based on search information, and the search result includes at least one search content.

The client may include a service of providing a local program for an object, and may receive the control and management of the server and share various resources on the network. For example, the client may include an instant messaging client, a browser client, a game client, a news information client, a video client and a music client.

The search content may include a content searched based on the search information.

The search information may describe the commonality between each search content. For example, the search information may include at least one of a key word, a search image, a search audio and the like.

For example, in response to that the search information is a search key word and the search key word is "happy new year", each search content may be a content associated with "happy new year."

For another example, in response to that the search information is a search audio and the search audio is "Kung Pao chicken", each search content may be a content associated with "Kung Pao chicken."

For another example, in response to that the search information is a search image, the search content may be a content associated with the search image.

In some embodiments, the search content may be of various different content types. For example, the search content may include at least one content type of an expression content type, a music content type, an encyclopedia content type, a news content type, a video content type and the like.

The search content belonging to the expression content type may be a meme related to the search information. The search content belonging to the music content type may be a song related to the search information. The search content belonging to the encyclopedia content type may be the explanation and introduction of the search information. The search content belonging to the news content type may be news related to the search information. The search content belonging to the video content type may be a video related to the search information.

For example, there are 100 search contents. In the 100 search contents, some search contents belong to the expression content type, some search contents belong to the music content type, and some search contents belong to the encyclopedia content type.

For another example, 100 search contents related to "happy new year" are searched. The 100 search contents include a meme related to "happy new year", a song related to "happy new year", news related to "happy new year", and a video related to "happy new year."

The search result page may be a page displaying a search content. A browsing medium of a search content may be provided for a first object in a first client by the search result page.

The first object may refer to an object logging in the first client. For example, when an object Xiaoming logs in the first client, the first object corresponding to the first client may be Xiaoming.

In some embodiments, the search result page of the first client may be displayed in many ways.

For example, the first object may operate the first client so as to trigger the first client to display the search result page.

For example, the first object may input the search information to the first client, and the first client may search based on the search information to obtain a search result, and display a search result page including the search result. For example, the first object may input "happy new year" in a text search bar of the first client, and the first client may search based on the search key word "happy new year" and display the searched search content to the first object through the search result page.

For another example, the first object may trigger the first client by voice to search, and the first client may display the searched search result through the search result page. For example, the first object may trigger the first client by voice to search "happy new year", and the first client may search based on the voice search word "happy new year" and display the searched search content to the first object through the search result page.

For another example, the first object may trigger the first client by an image to search, and the first client may display the searched search result through the search result page. For example, the first object may input the image to an image identifying search box in the first client. Then, the first client may identify the image, extract feature information of the image, and search a search content that conforms to the feature information of the image. Then, the first client may display the searched search content to the first object through the search result page.

Figure 3:
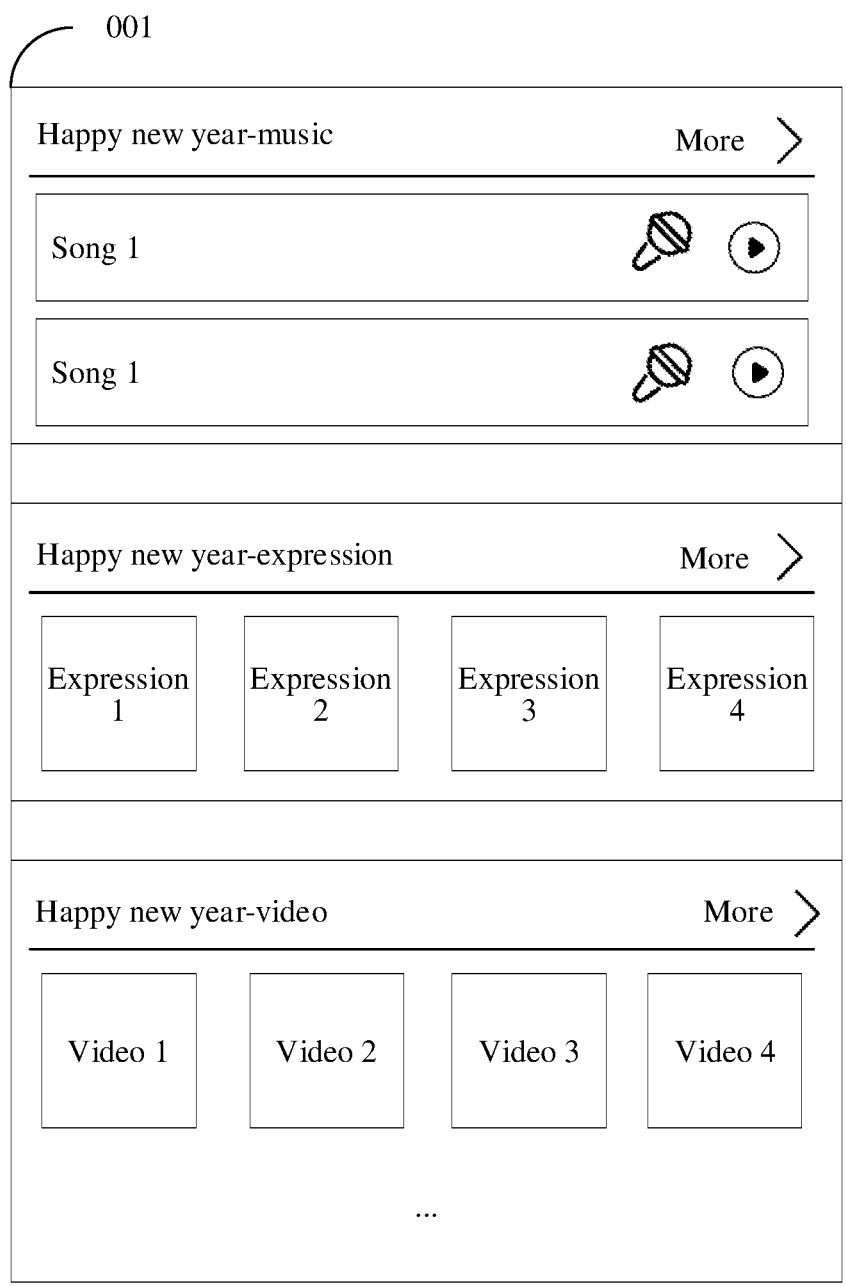
FIG. 3 is a schematic diagram of a scenario of a search result page according to certain embodiment(s) of the present disclosure.

In some embodiments, the search result displayed in the search result page may be search contents of various different content types. For example, as shown in FIG. 3, in response to that the search information is the search key word "happy new year", the search result page 001 may include songs, expressions and videos related to "happy new year."

Figure 4:
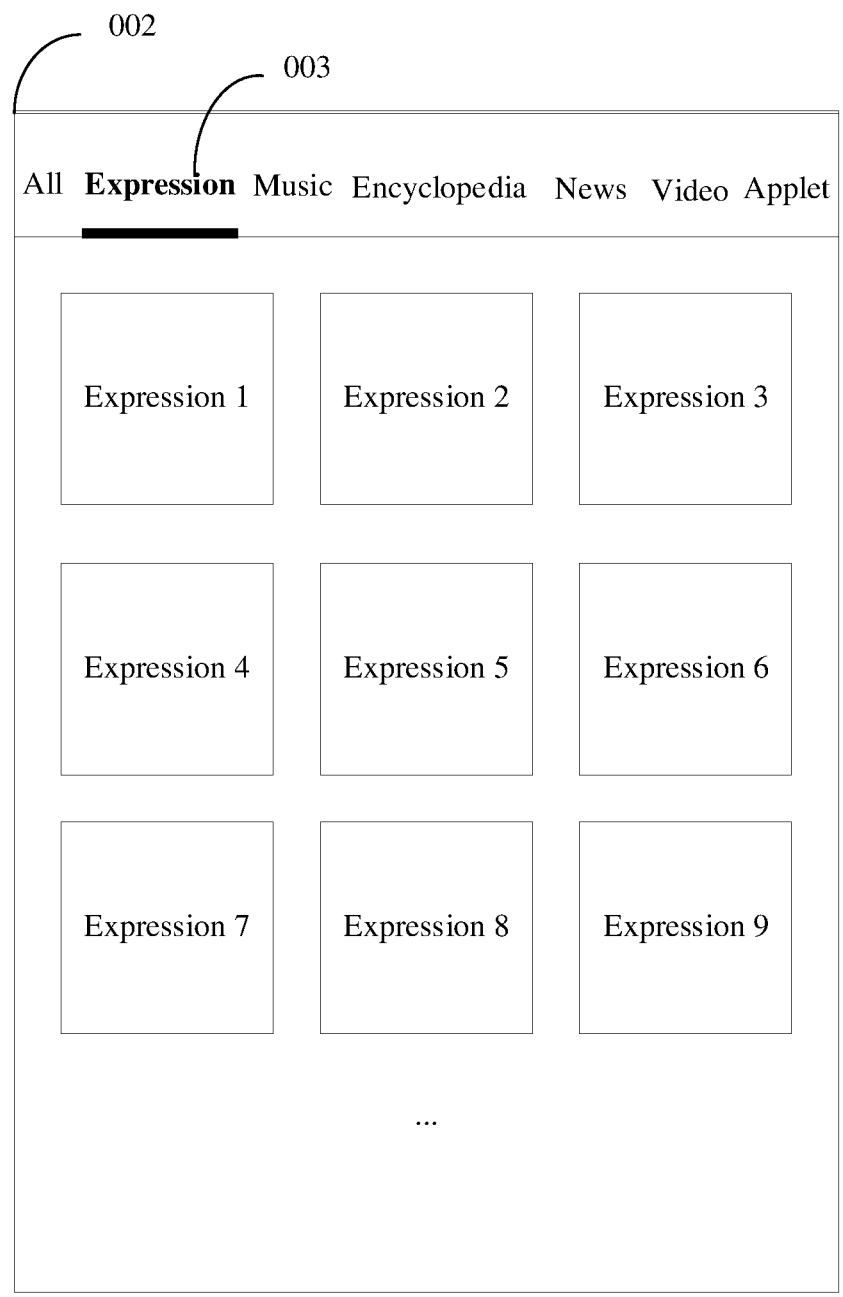
FIG. 4 is a schematic diagram of another scenario of a search result page according to certain embodiment(s) of the present disclosure.

In some embodiments, the search result displayed in the search result page may further be search contents of only one content type. For example, as shown in FIG. 4, in response to that the search information is the search key word "happy new year", the search result page 002 may only display expressions related to "happy new year."

In response to that the search result page displays one content type of search contents, the search result page may further include at least one content type identifier, where one content type identifier may correspond to one content type of search contents.

The content type identifier may identify the content type of the search content. Through the content type identifier, an object may know what content type the currently browsed search content belongs to. For example, the content type identifier may be one control displayed in the search result page. For example, as shown in FIG. 4, 003 in FIG. 4 may be a content type identifier, where the content type identifier may be one control.

In some embodiments, in response to that the content type identifier is one control, the first object may trigger the content type identifier such that the search result page displays the search content corresponding to the content type.

In some embodiments, the step "displaying a search result page of a first client, where the search result page includes a search result searched based on search information, and the search result includes at least one search content" may include:

displaying a search content corresponding to a target content type in response to a trigger operation for a target content type identifier, where the target content type is a content type corresponding to the target search content.

The target search content may include a search content that a first object in a first client wants to share with a second object in a second client. The target content type identifier is a content type identifier corresponding to the target content type.

For example, the first object Xiaoming searches a content associated with "happy new year" through the first client. Then, Xiaoming wants to share one of songs related to "happy new year" with Xiaohong. At this time, the song that Xiaoming wants to share may be the target search content.

The target content type may be a content type corresponding to the target search content. For example, the content type of the song that Xiaoming wants to share is a music content type, and a target content type identifier corresponding to the music content type is a music content type identifier.

In some embodiments, the first search content sharing apparatus may display a search content corresponding to a target content type in response to a trigger operation for a target content type identifier.

The trigger operation may include a plurality of operations. For example, the trigger operation may include a slide operation or a click operation.

For example, Xiaoming wants to share a song related to "happy new year" with Xiaohong, Xiaoming may make the search result page display a search content corresponding to a music content type, so Xiaoming may click a music content type identifier in the search result page. In response to that Xiaoming clicks the music content type identifier, the first search content sharing apparatus may display the search content corresponding to the music content type in response to the trigger operation corresponding to the music content type identifier.

For another example, Xiaoming wants to share an expression related to "happy new year" with Xiaohong, Xiaoming may make the search result page display a search content corresponding to an expression content type, so Xiaoming may click an expression content type identifier in the search result page. In response to that Xiaoming clicks the expression content type identifier, the first search content sharing apparatus may display the search content corresponding to the expression content type in response to the trigger operation corresponding to the expression content type identifier.

In this embodiment, the search content corresponding to the target content type is displayed rapidly and conveniently by the target content type identifier, so that the interaction efficiency is improved and computer resources are saved.

102: Transmitting a message to a second client in response to a transmitting operation for a target search content of the at least one search content, where the message instructs the second client to display the target search content and a search identifier corresponding to the target search content in a session page after receiving the message, and the search identifier is used for identifying source information of the target search content.

The target search content may be a search content that a first client shares with a second client. For example, the target search content may be a search content selected by an object of the first client from at least one search content and shared with the second client. For another example, the target search content may be a content randomly screened by the first client from at least one search content and shared with the second client.

The source information of the target search content may include a search result searched by the first client based on the search information corresponding to the target search content. For example, all the search contents searched by the first client based on the search information may be included through the source information of the target search content. For another example, through the source information of the target search content, it may be known how the first client displays the target search content and how the first client searches the target search content.

The search identifier may be used for identifying the source information of the target search content. For example, an object of the second client may trigger the search identifier, so that a page as same as the search result page of the first client is displayed in the second client.

The message may be generated based on the target search content; therefore, the message may instruct the second client to display the target search content and the search identifier corresponding to the target search content in the session page after receiving the message.

The transmitting operation includes an operation that may transmit the message from the first client to the second client. For example, the transmitting operation may be at least one of a single-click operation, a double-click operation, a voice control operation or a slide operation.

In some embodiments, in response to that a first object of the first client transmits the target search content to a second object of the second client, the first search content sharing apparatus may display a content confirmation page to the first object, so that the first object confirms the target search content in order to improve the transmitting accuracy. In response to that the first object confirms that the target search content is correct, the first search content sharing apparatus may transmit a message including the target search content to the second client.

In certain embodiment(s), the step "transmitting a message to a second client in response to a transmitting operation for a target search content of the at least one search content" may include:
  displaying a content confirmation page in response to a selection operation for the at least one search content, where the content confirmation page includes the target search content; and
  transmitting the target search content in the content confirmation page to the second client in response to a transmitting operation for the content confirmation page.

In some embodiments, the first search content sharing apparatus displays a search result page of the first client, where the search result page includes at least one search content. Then, the first object may select the search content in the search result page. The first search content sharing apparatus may display a content confirmation page in response to a selection operation for at least one search content, where the content confirmation page may include a target search content.

Figure 5:
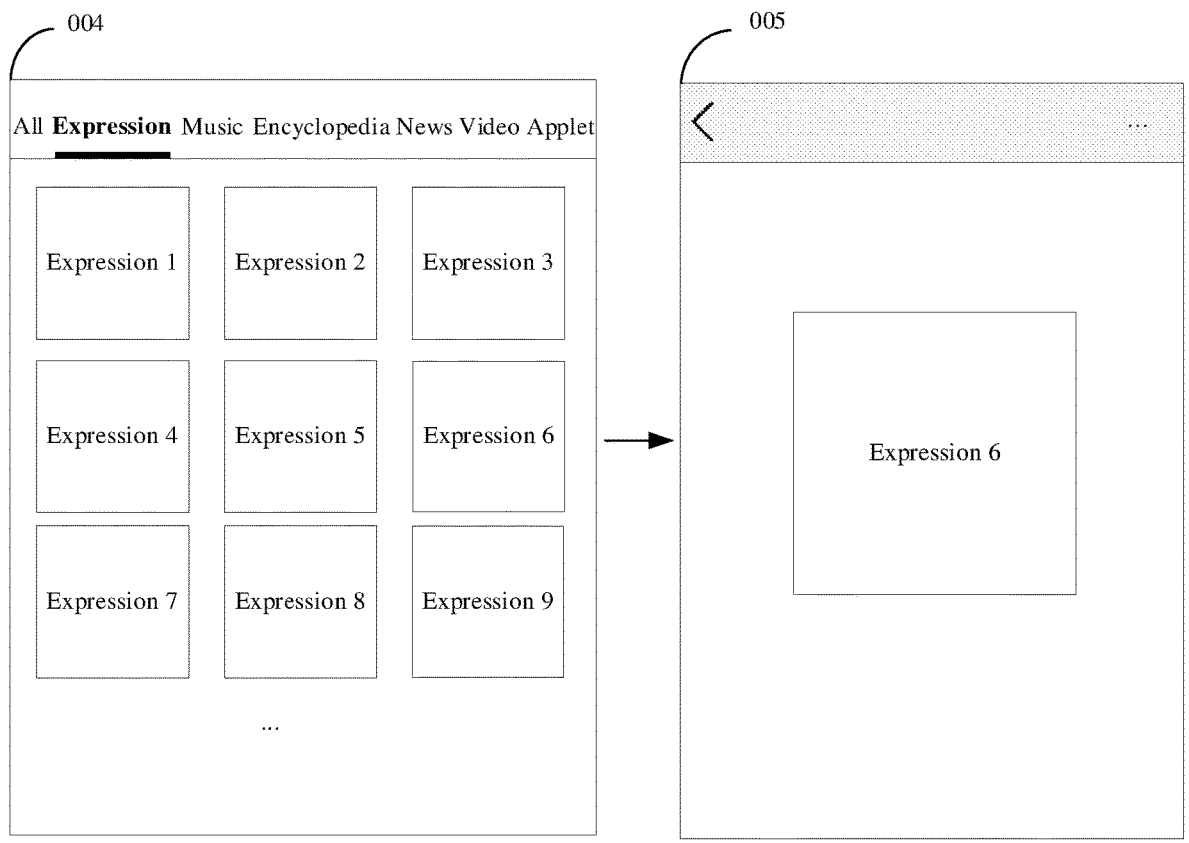
FIG. 5 is a schematic diagram of a scenario of displaying a content confirmation page according to certain embodiment(s) of the present disclosure.

For example, the scenario where one content type of search contents is displayed in the search result page is taken as an example for description. For example, the first object Xiaoming search expressions related to a search key word "happy new year" through the first client. At this time, the first client may display the search result page 004, where the search result page includes a plurality of expressions related to the search key word "happy new year", as shown in FIG. 5. Then, Xiaoming selects an expression 6 in the search result page 004 to share with Xiaohong. For example, Xiaoming clicks the expression 6, and the first search content sharing apparatus may display the content confirmation page 005 in response to the selection operation for the expression 6, where the content confirmation page may include the expression 6, as shown in FIG. 5.

In response to that Xiaoming confirms that the expression 6 is the search content he wants to share with Xiaohong, the first search content sharing apparatus may transmit the target search content in the content confirmation page to the second client in response to the transmitting operation for the content confirmation page 005.

In this embodiment, the target search content may be transmitted to the second client only in response to that the transmitting operation for the content confirmation page is received, so that the number of times of transmitting errors is reduced, the interaction efficiency is improved and computer resources are saved.

In some embodiments, the first object in the first client may share the target search content with the second object; therefore, the first search content sharing apparatus may further display a transmission object selection page in response to the transmitting operation for the target search content, so that the first object selects a target object to share the target search content. In certain embodiment(s), the step "transmitting a message to a second client in response to a transmitting operation for a target search content of the at least one search content" may include:
  displaying a transmission object selection page in response to the transmitting operation for the target search content, where the transmission object selection page includes at least one project object, and the project object has an association relationship with the first object of the first client; and
  transmitting the message to the target object in the second client in response to a selection operation for the target object of the at least one project object.

The project object may be an object to-be-selected, and may include an object having an association relationship with the first object of the first client. The association relationship between the project object and the first object may be determined by the nature of the first client. For example, in response to that the first client is an instant messaging client, the project object may be an object in a friend list of the first object. For another example, in response to that the first client is a game client, the project object may be an object in a same game as the first object. For another example, in response to that the first client is a music client, the project object may be an object interacting with the first object. For example, the project object and the first object comment a same song, or the project object replies to a comment of the first object.

Figure 6:
FIG. 6 is a schematic diagram of a scenario of a transmission object selection page according to certain embodiment(s) of the present disclosure.

In some embodiments, a transmission object selection page may be displayed in response to a transmitting operation for the target search content. Taking the scenario where the first client is an instant messaging client as an example, for example, as shown in FIG. 6, 006 in FIG. 6 may be a transmission object selection page. In FIG. 6, the project object may include Xiaohong, Xiaohuang, Zhang San and Li Si. In addition, the project object may further include a group chat object. For example, as shown in FIG. 6, the project object may further include a group chat A and a group chat B.

In some embodiments, a message may be transmitted to a target object in the second client in response to a selection operation for the target object of at least one project object. For example, the first object Xiaoming selects Xiaohong as the target object. Then, the first search content sharing apparatus may transmit the message to a client (equivalent to the second client) corresponding to the target object.

In this embodiment, a transmission object selection page is displayed, where the transmission object selection page includes at least one project object, so that an object to be shared with may be flexibly selected, the interaction efficiency is improved, and computer resources are saved.

In some embodiments, the message transmitted to the second client may carry an object identifier of the target object and search attribute information of the target search content, in order that the message may be transmitted to the client corresponding to the target object and the second client may display the source information corresponding to the target search content, such that the target object may browse the source information of the target search content In certain embodiment(s), the step "transmitting the message to the target object in the second client in response to a selection operation for the target object of the at least one project object" may include:
  identifying the target object in response to the selection operation for the target object to obtain an object identifier of the target object;
  generating search attribute information of the target search content based on the target search content;
  packing the target search content, the search attribute information of the target search content, and the object identifier of the target object to obtain the message; and
  transmitting the message to a server such that the server forwards the message to the second client.

The object identifier of the target object may include information for distinguishing the target object from other objects.

The search attribute information of the target search content may describe the nature and relationship of the target search content in a search dimension. For example, the search attribute information of the target search content may include what search engine searches the target search content, and identification information of the target search content in the search result.

In some embodiments, a target object may be identified in response to a selection operation for the target object to obtain an object identifier of the target object. An object identifier of each object may be stored in the first client. Therefore, the first search content sharing apparatus may identify a storage file in the first client in response to the selection operation for the target object so as to obtain the object identifier of the target object.

In this embodiment, since the message includes search attribute information of the target search content, a computing device for receiving the message may search according to the search attribute information to obtain a shared search content, thereby improving the search efficiency and saving computer resources.

In some embodiments, search attribute information of the target search content may be generated based on the target search content. In certain embodiment(s), the step "generating search attribute information of the target search content based on the target search content" may include:
  performing information extraction on a search result to obtain search engine identification information corresponding to the search result;
  identifying the target search content to obtain identification information of the target search content in the search result; and
  packaging the search engine identification information, the identification information and search information corresponding to the target search content to obtain the search attribute information.

The search engine identification information may describe what search engine searches the search content. For example, in response to that the search result is searched based on four search engines, the search engine identification information may include identification information corresponding to the four search engines.

The search identification information of the target search content in the search result may be a unique identity document (ID) of the target search content in the search result. For example, the identification information of the target search content in the search result may refer to a unique ID of the target search content in the search engine. For another example, the identification information of the target search content in the search result may describe the rank of the search content in the search engine.

In some embodiments, in order to display source information of the target search content in the second client, the message may carry search engine identification information corresponding to the search result, and search information of the target search content. Therefore, the second client may transmit a search request to a related search engine based on the search information and obtain and display the source information of the target search content. In addition, the message may further carry and provide identification information of the target search content in the search result to the second client to determine whether the acquired source information of the target search content is correct.

Therefore, the first search content sharing apparatus may perform information extraction on the search result to obtain the search engine identification information corresponding to the search result; identify the target search content to obtain identification information of the target search content in the search result; package the search engine identification information, the identification information and search information corresponding to the target search content to obtain the search attribute information.

For example, the search result will generally carry search engine identification information and store the search engine identification information to a document associated with the search result. Therefore, the first search content sharing apparatus may traverse the document associated with the search result to obtain the search engine identification information corresponding to the search result. In addition, the first search content sharing apparatus may further traverse the document associated with the search result to obtain the identification information in the search result. Then, the first search content sharing apparatus may integrate the search engine identification information, the identification information and the target search content into a piece of information so as to obtain the search attribute information.

In this embodiment, since the search attribute information includes the search engine identification information and the identification information of the target search content in the search result, a computing device for receiving a message may acquire the target search content according to the search attribute information, thereby improving the efficiency of acquiring the search content and saving computer resources.

In some embodiments, after the object identifier of the target object and the search attribute information of the target search content is obtained, the target search content, the search attribute information of the target search content and the object identifier of the target object may be packed to obtain a message.

Packing may refer to converting the target search content, the search attribute information of the target search content and the object identifier of the target object into a format that may be transmitted, so that the first search content sharing apparatus may successfully transmit the message, and the second search content sharing apparatus may successfully receive the message and identify the contents carried in the message.

For example, the target search content, the search attribute information of the target search content and the object identifier of the target object may be subjected to binary serialization according to a preset communication protocol, that is, the target search content, the search attribute information of the target search content and the object identifier of the target object may be represented by binary. Then, a converted binary sequence may be transmitted as a message.

In some embodiments, when transmitting the message to the second client, the first search content sharing apparatus may transmit the message to a server and forward the message through the server. When the message is forwarded through the server and after the server receives the message, a target search content description protocol may be generated according to information carried in the message, the message may be updated based on the target search content description protocol, and the updated message may be forwarded to the second search content sharing apparatus.

The search content description protocol may be a protocol for describing information related to the target search content. The search content description protocol has various fields and has extensibility; and the search content description protocol may carry a search identifier. For example, the search content description protocol may be Appmsg. An extensible markup language (XML) text for describing client service data has extensibility with different fields defining different service semantics.

In some embodiments, after receiving the message transmitted by the first search content sharing apparatus, the server may obtain the target search content, the search attribute information of the target search content, and the object identifier of the target object carried in the message. Then, the server may fill the target search content, the search attribute information of the target search content, and the object identifier of the target object into the corresponding fields in the preset search content description protocol to obtain a filled search content description protocol. Then, the server may further generate a search identifier for the filled search content description protocol, and correspondingly add the search identifier to the filled search content description protocol to obtain the target search content description protocol. Then, the server may update the information carried in the message into the target search content description protocol, and forward the updated message to the corresponding client according to the object identifier of the target object.

In some embodiments, to improve the information safety, the first client may further determine an association relationship between an object corresponding to the first client and an object corresponding to the second client before transmitting the message. Then, it may be determined whether a search identifier is displayed in a session page of the second client based on the association relationship between a first object and a second object.

In certain embodiment(s), the first search content sharing apparatus may determine the association relationship between the object corresponding to the first client and the object corresponding to the second client based on the object identifier; match the association relationship with a preset association relationship; and add a search identifier display mark on the message in response to that the association relationship is matched with the preset association relationship, so that the second client may display the search identifier on the session page based on the search identifier display mark.

The association relationship between the object corresponding to the first client and the object corresponding to the second client may describe what the relationship is between the first object and the second object. For example, the association relationship between the first object and the second object may be a friend relationship, a non-friend relationship, a frequent interaction relationship, a like relationship or a message relationship.

For example, the object corresponding to the second client may only include one person, or may include many people. For example, Xiaoming may only share the target search content with Xiaohong, or may share the target search content with a chat group including many people. In the chat group including many people, other people who are not Xiaoming's friends or other people who have not interacted with Xiaoming may be included, and in response to that a search identifier is displayed, information may be leaked.

Therefore, before transmitting the message, a first search content sharing client may determine the association relationship between the object corresponding to the first client and the object corresponding to the second client so as to determine whether to display the search identifier in the second client.

The preset association relationship may include a friend relationship, a message relationship and a comment relationship.

For example, the first search content sharing apparatus may know the target search content is to be shared with which objects in the second client after parsing the object identifier corresponding to the target search content. Then, the first search content sharing apparatus may determine the association relationship between the object corresponding to the first client and the object corresponding to the second client. For example, Xiaoming wants to share the target search content with a chat. Then, the first search content sharing apparatus may determine that Xiaoming is in the chat group. Then, the first search content sharing apparatus may determine the association relationship between Xiaoming and each object in the chat. For example, in response to that the group includes an object who is not Xiaoming's friend, the search identifier display mark may not be added in the message, so that the search identifier will be displayed in the session page of the second client. For another example, in response to that objects in the group and Xiaoming are friends, the search identifier display mark may be added in the message, so that the search identifier may be displayed in the session page of the second client.

In some embodiments, the first search content sharing apparatus may further generate a target search content description protocol by itself and transmit the target search content description protocol to the second client.

For example, the first search content sharing apparatus may fill information, such as the target search content, the search attribute information of the target search content, and the object identifier of the target object, into a preset search content description protocol to obtain the target search content description protocol and transmit the target search content description protocol to the second client.

For another example, the target search content, the content type of the target search content, the search attribute information of the target search content, and the object identifier of the target object may be filled into a preset search content description protocol to obtain a target search content description protocol.

For example, in response to that the search result page further includes at least one content type identifier, the step "transmitting a message to a second client in response to a transmitting operation for a target search content of the at least one search content" may include:

- generating search attribute information of the target search content in response to the transmitting operation for the target search content of the at least one search content;
- filling the search attribute information and the content type of the target search content into a preset search content description protocol to obtain a target search content description protocol; and
- transmitting a message including the target search content description protocol to the second client.

The method of generating the target search attribute information may be referred to the step "generating search attribute information of the target search content based on the target search content."

In some embodiments, the search attribute information and the content type of the target search content may be filled into corresponding fields of the preset search content description protocol to obtain a filled search content description protocol. In addition, the first search content sharing apparatus may further generate a search identifier based on the filled search content description protocol and add the search identifier into the filled search content description protocol to obtain a target search content description protocol.

The search identifier may be associated with the source information of the target search content by filling the source information of the target search content and the search identifier into the search content description protocol, so that the source information of the target search content may be displayed in the second client after the object in the second client triggers the search identifier.

In some embodiments, in response to that the first search content sharing apparatus fills the search attribute information and the content type of the target search content into the corresponding fields in the preset search content description protocol, it may be determined whether a search identifier is added in the preset search content description protocol based on the association relationship between the object corresponding to the first client and the object corresponding to the second client.

In the embodiments, since the transmitted message includes the target search content description protocol, a computing device for receiving a message may obtain the search attribute information corresponding to the target search content according to the target search content description protocol, thereby improving the interaction efficiency and saving computer resources.

An embodiment of the present disclosure provides a search content sharing method, which may include the following steps: displaying a search result page of a first client, where the search result page includes a search result searched based on search information, and the search result includes at least one search content; and transmitting a message to a second client in response to a transmitting operation for a target search content of the at least one search content, where the message instructs the second client to display the target search content and a search identifier corresponding to the target search content in a session page after receiving the message, and the search identifier is used for identifying source information of the target search content. By the method provided by this embodiment of the present disclosure, the first object may share and forward the target search content to an object to be shared with, and the forwarded target search content will carry a search mark, so that the shared object may rapidly enter a page as same as the search result page by triggering the search mark, thereby sharing the search content, improving the search efficiency and meeting the immediate search desirables of the object.

In addition, an embodiment of the present disclosure further provides another search content sharing method. Then, description will be made from the perspective of the second search content sharing apparatus, the second search content sharing apparatus may be integrated in a computing device, and the computing device may be a server or a device such as a terminal.

Figure 7:
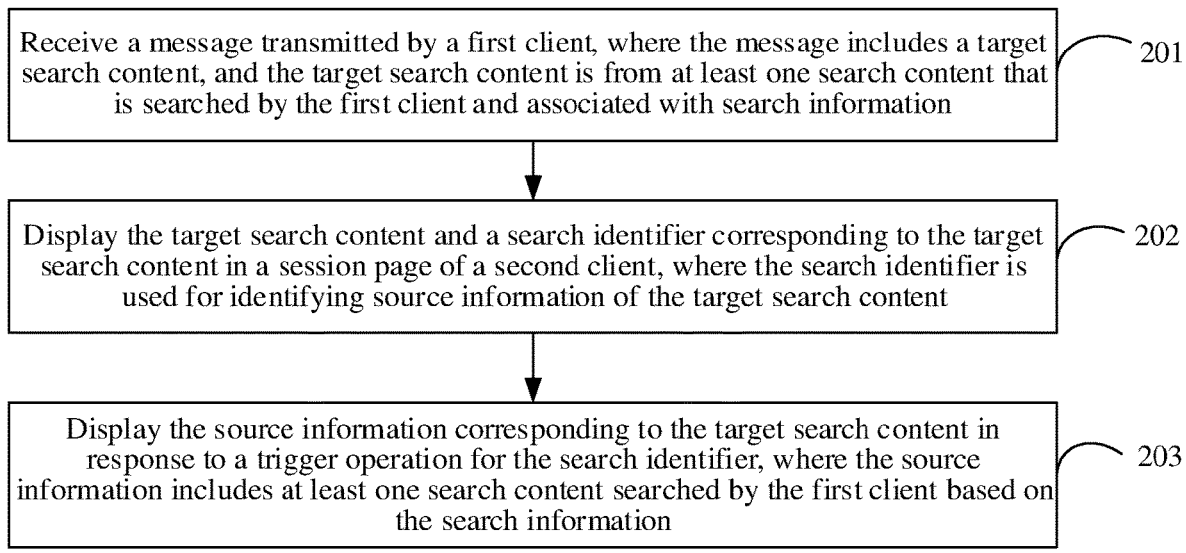
FIG. 7 is another schematic flowchart of a search content sharing method according to certain embodiment(s) of the present disclosure.

As shown in FIG. 7, a search content sharing method is provided and may include the following steps:

201: receiving a message transmitted by a first client, where the message includes a target search content, and the target search content is from at least one search content that is searched by the first client and associated with search information.

The target search content may include a search content that a first object in a first client wants to share with a second object in a second client.

The search content may include a content searched based on the search information.

The search information may describe the commonality between the search contents. For example, the search information may include at least one of a key word, a search image, a search audio and the like.

For example, Xiaoming searches many expressions by searching a key word "happy new year" on the first client, and shares one of the expressions with Xiaohong. Then, the second client of Xiaohong may receive the message, where the message may include an expression that Xiaoming wants to share with Xiaohong.

The first client and the second client may be the same or different. For example, the first client may be an instant messaging client A, and the second client may alternatively be the instant messaging client A. For another example, the first client may be an instant messaging client A, and the second client may be an instant messaging client B. For another example, the first client may be an instant messaging client A, and the second client may be a music client C. For another example, the first client may be a music client C, and the second client may be a video client D.

202: Displaying the target search content and a search identifier corresponding to the target search content in a session page of the second client, where the search identifier is used for identifying source information of the target search content.

The session page may refer to a page where a first object may communicate a message with a second object. For example, by the session page, the second client may display to Xiaohong with a message which is transmitted to Xiaohong by Xiaoming.

The search identifier may be used for identifying the source information of the target search content. For example, an object of the second client may trigger the search identifier, so that a page as same as the search result page of the first client is displayed in the second client. In addition, the search identification information may further play a role in prompting a second object in the second client. For example, the search identifier may be a corresponding test, and the text is used for reminding the second object how to trigger to display the source information of the target search content in the second client. For another example, the search identifier may be a corresponding test and icon, and the text and the icon are combined jointly to remind the second object how to trigger to display the source information of the target search content in the second client.

The second object may be an object logging in the second client. For example, in response to that the second client is an instant messaging client, the second object may be an object logging in a related account on the second client. At this time, a second communication client may include a communication friend, an account level and account setting information of the second object. For another example, in response to that the second client is a music client and after the second object logs in the second client, the second client may include songs collected by the second object and singers followed by the second object. For example, when Xiaohong logs in a related account on the second client, the second object of the second client may be Xiaohong.

The source information of the target search content may include a search result searched by the first client based on the search information corresponding to the target search content. For example, all the search contents searched by the first client based on the search information may be included through the source information of the target search content. For another example, through the source information of the target search content, it may be known how the first client displays the target search content and how the first client searches the target search content.

Figure 8:
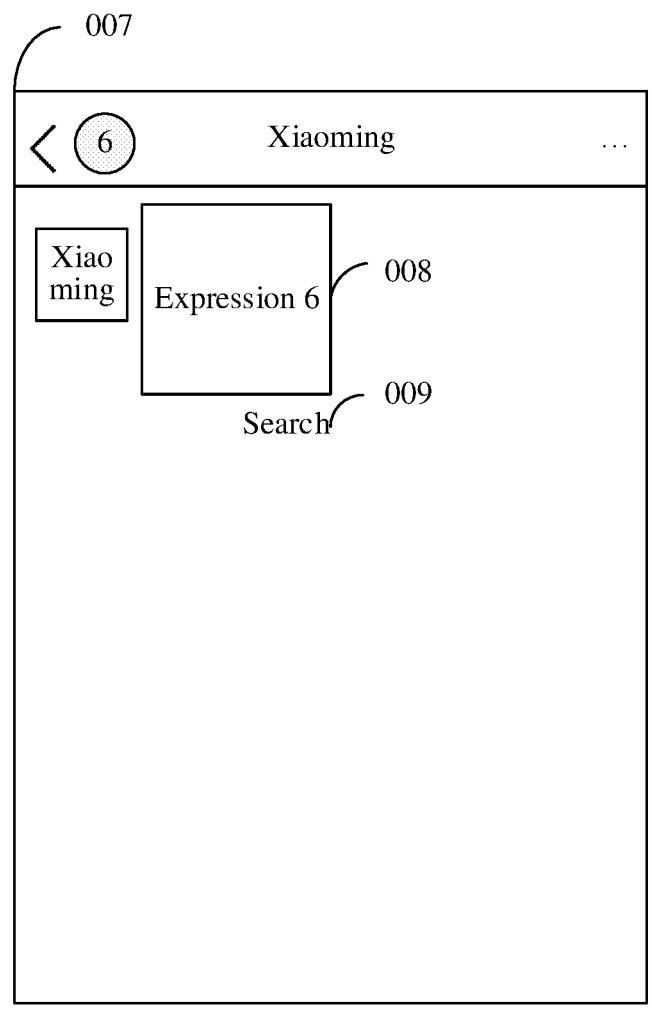
FIG. 8 is a schematic diagram of a scenario of a session page according to certain embodiment(s) of the present disclosure.

In some embodiments, a target search content and a search identifier corresponding to the target search content may be displayed in a session page of the second client. For example, as shown in FIG. 8, 007 is the session page, 008 is the target search content, and 009 is the search identifier in FIG. 8.

In some embodiments, after receiving the message, the second search content sharing apparatus may parse the message to obtain an object identifier corresponding to the target search content, and determine whether a receiving error of the message is present through the object identifier. In certain embodiment(s), the method may include the following steps before the step "displaying the target search content and a search identifier corresponding to the target search content in a session page of the second client":

parsing the message to obtain an object identifier corresponding to the target search content;
determining a target object in the second client based on the object identifier; and
displaying a session page for the target object in the second client.

In some embodiments, an object identifier corresponding to the target search content may be matched with an object identifier of an object logging in the second client. In response to that the object identifier of the target search content and the object identifier in the second client are the same, it means that the message transmission is correct, and at this time, the session page for the target object may be displayed in the second client.

In the embodiment, the target object may be rapidly determined through the object identifier corresponding to the target search content and obtained by parsing the message, thereby rapidly displaying the session page for the target object and improving the interaction efficiency.

203: Displaying the source information corresponding to the target search content in response to a trigger operation for the search identifier, where the source information includes at least one search content searched by the first client based on the search information.

In some embodiments, the search identifier provides a prompt function that may be associated with source information of a target search content; therefore, the source information corresponding to the target search content may be displayed in response to a trigger operation for the search identifier, where the source information includes at least one search content searched by the first client based on search information.

For example, as shown in FIG. 8, the search identifier 009 may be in the form of a text, such as "search." After the second object clicks "search", the second search content sharing apparatus may display the source information corresponding to the target search content in response to the trigger operation for the search identifier, where the source information includes at least one search content searched by the first client based on the search information.

Figure 9:
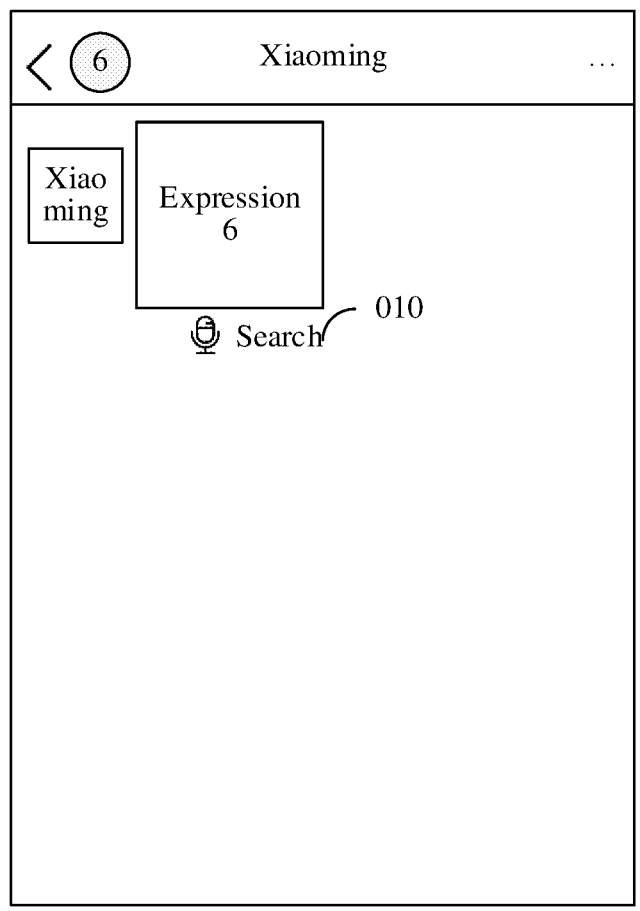
FIG. 9 is a schematic diagram of another scenario of a session page according to certain embodiment(s) of the present disclosure.

For another example, the search identifier may also be shown in 010 in FIG. 9, and the identifier triggers the second search content sharing apparatus by voice to display the source information corresponding to the target search content in response to the trigger operation for the search identifier. For example, when the second object inputs voice information "search" to a second search client, the client may be triggered to display the source information corresponding to the target search content.

In some embodiments, source information corresponding to the target search content is displayed in response to a trigger operation for a search identifier, where the source information includes at least one search content searched by the first client based on search information. The search content displayed in the second client may be the same as the search content displayed in a search result page in the first client.

In some embodiments, source information may include at least one search content searched by the first client based on search information, where the at least one search content may include a search content corresponding to a first content type of a plurality of content types searched by the first client.

The first content type may be one of the plurality of content types.

For example, the first client may search a plurality of search contents with different content types. For example, Xiaoming searches a search content related to a search key word "happy new year" by the first client. The first client searches a meme related to "happy new year", a song related to "happy new year", news related to "happy new year" and a video related to "happy new year." Only a meme related to "happy new year" may be displayed in the second client.

In some embodiments, in response to that source information may include at least one search content searched by the first client based on search information, where the at least search content may include a search content corresponding to a first content type of a plurality of content types searched by the first client, the step "displaying the source information corresponding to the target search content in response to a trigger operation for the search identifier" may include:

displaying a search content corresponding to a first content type in response to a trigger operation for a search identifier.

Figure 10:
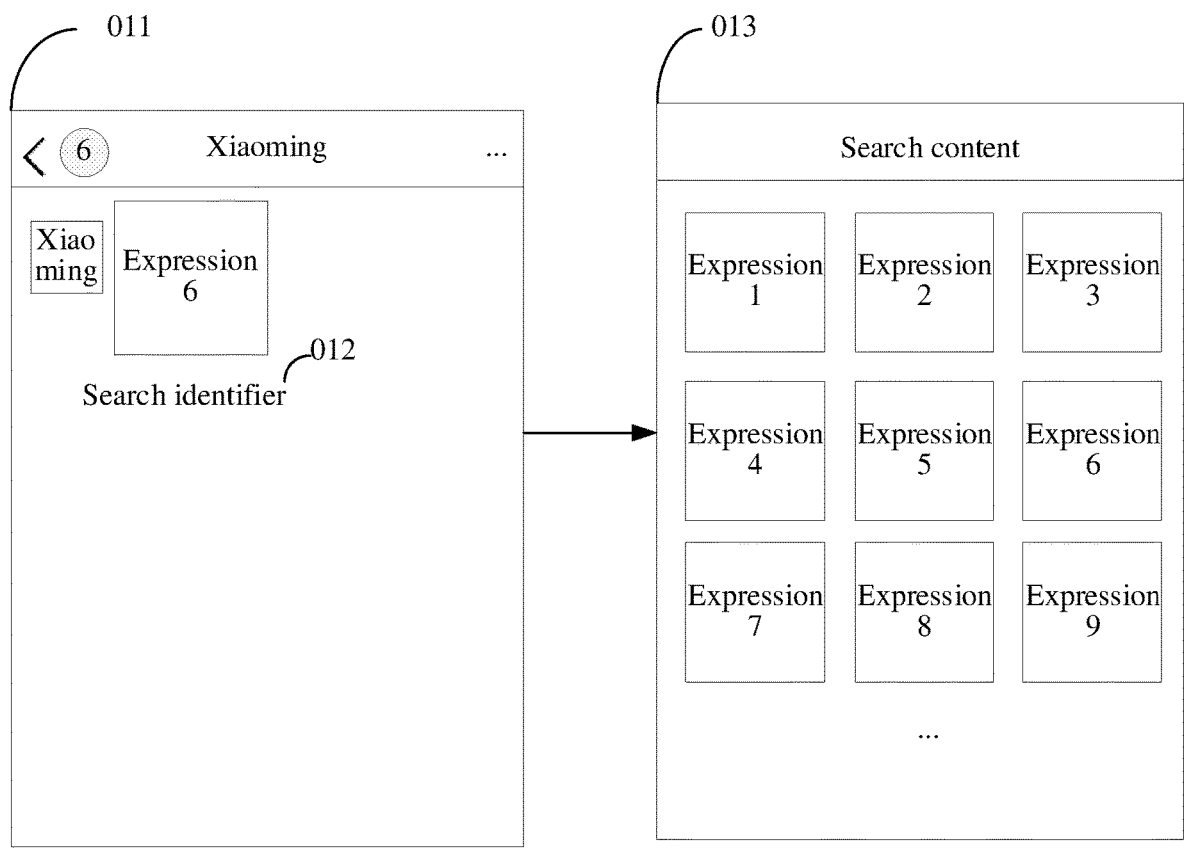
FIG. 10 is a schematic diagram of a scenario of displaying source information of a target search content according to certain embodiment(s) of the present disclosure.

For example, as shown in FIG. 10, the search content corresponding to the first content type is displayed in response to the trigger operation for the search identifier 012 in the session page 011. For example, as shown in 013 in FIG. 10, a search content of the expression type is displayed.

In some embodiments, in response to that a search content corresponding to a first content type is displayed in the second client, the search content corresponding to the first content type may be switched to displaying search content associated with search information under the second content type in response to a content switching operation. In certain embodiment(s), a method provided by this embodiment of the present disclosure may further include the following steps:

switching to displaying a search content, associated with the search information, under a second content type in response to a content switching operation.

Figure 11:
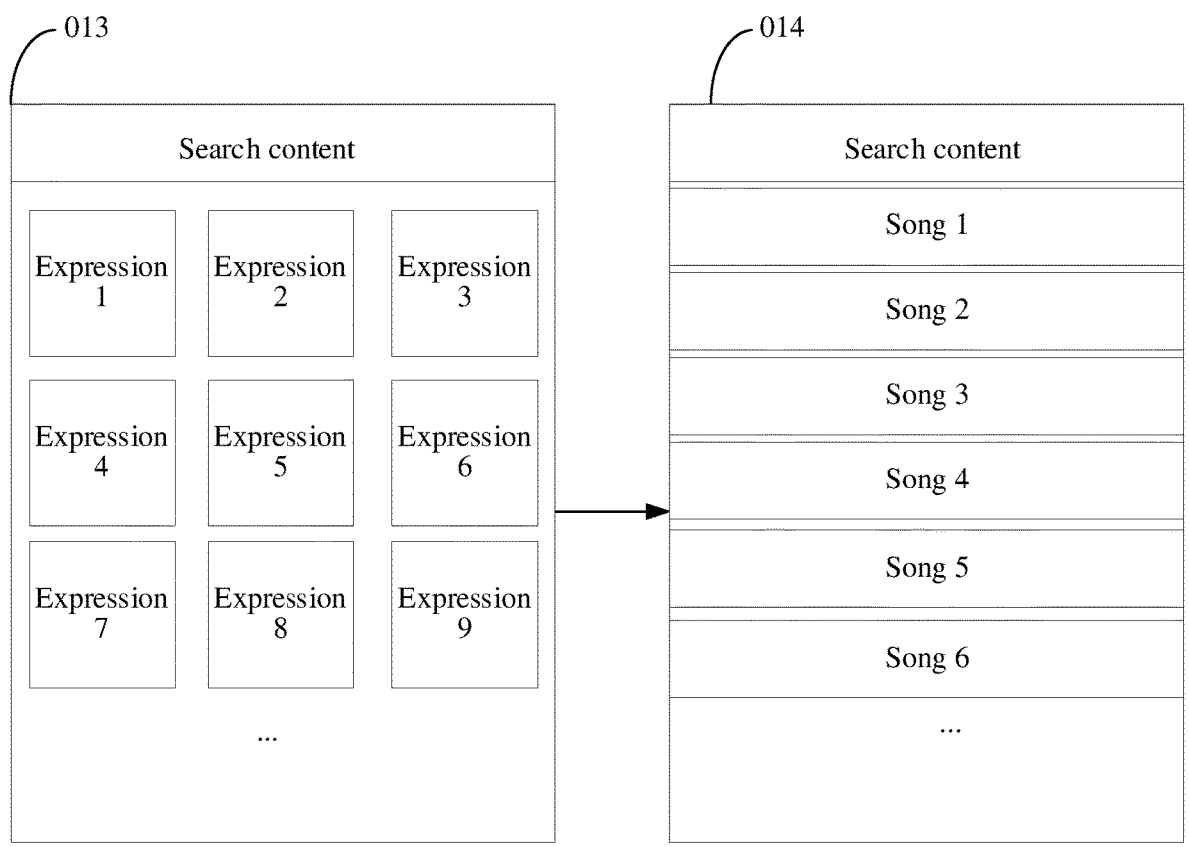
FIG. 11 is a schematic diagram of a scenario of switching different content types of search contents according to certain embodiment(s) of the present disclosure.

For example, as shown in FIG. 11, a search content 013 under an expression content type may be switched into a search content 014 under a music content type in response to the content switching operation.

In this embodiment, search contents under different content types may be flexibly switched in response to the content switching operation, so that the efficiency of viewing search contents under different content types is improved.

In some embodiments, in addition to displaying a search content under a certain content type, the second client may display a content type identifier corresponding to each content type. In certain embodiment(s), the step "displaying the search content corresponding to the first content type in response to the trigger operation for the search identifier" may include:

displaying a search content page in response to the trigger operation for the search identifier, where the search content page includes the search content corresponding to the first content type and at least one content type identifier, where one content type identifier corresponds to one content type of search contents.

The content type identifier is used for prompting an object of what content type the currently displayed search content belongs to. For example, Xiaohong may know whether the currently displayed search content is an expression content type or a song content type through the content type identifier.

In addition, the content type identifier may further provide a function of switching to displaying search contents of different content types for an object. That is, the content type identifier may act as a control, and the object may trigger the content type identifier so as to switch to displaying the search contents of different content types. For example, the search content of the first content type may be switched to displaying the search content of the second content type through a click or slide operation on the content type identifier. In certain embodiment(s), the step "switching to displaying a search content, associated with the search information, under a second content type in response to a content switching operation" may include:

switching to displaying the search content, associated with the search information, under the second content type in response to a trigger operation for a content type identifier corresponding to the second content type.

Figure 12:
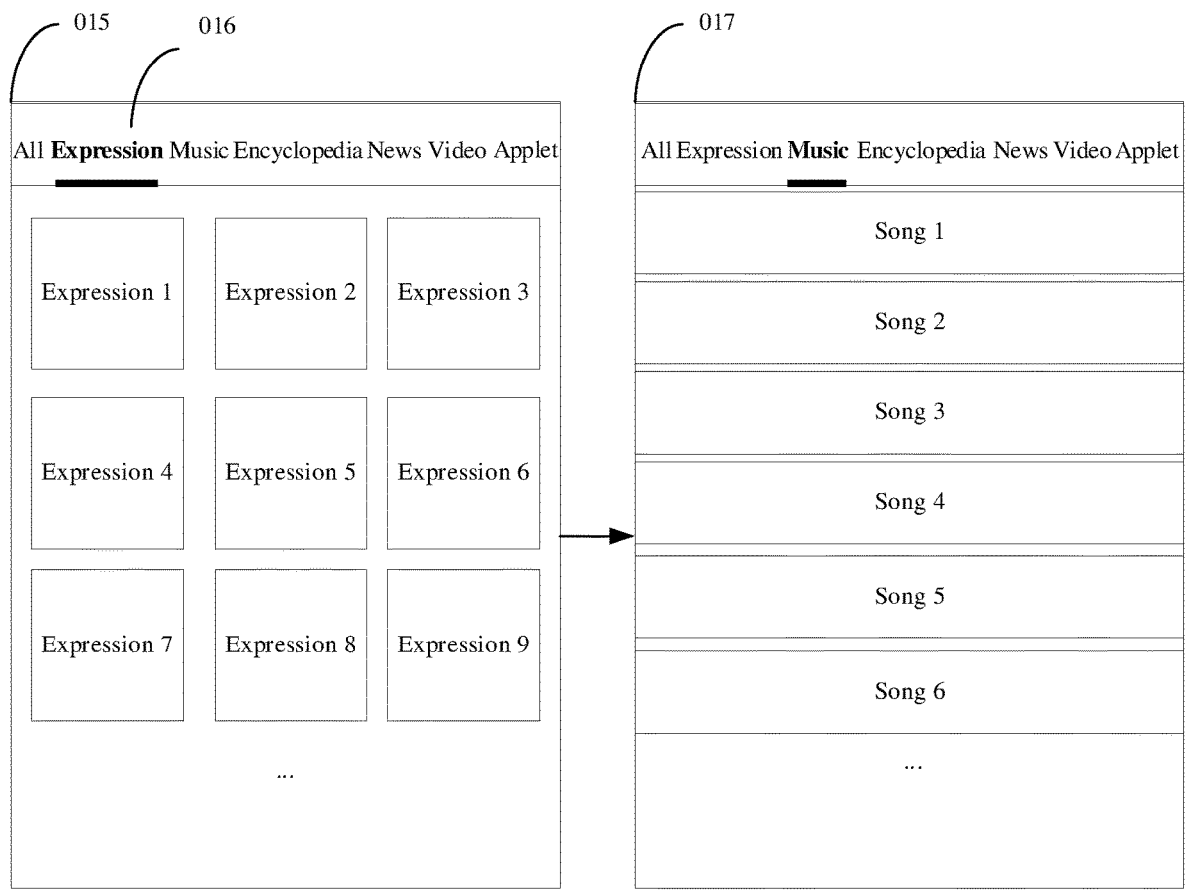
FIG. 12 is a schematic diagram of another scenario of switching different content types of search contents according to certain embodiment(s) of the present disclosure.

For example, as shown in FIG. 12, a search content page 015 is displayed in response to a trigger operation for a search identifier, where the search content page 015 may include a plurality of content type identifiers 016, and a search content corresponding to one of the content types. For example, the search content corresponding to the expression content type is displayed in FIG. 12.

It is switched to displaying the search content, associated with the search information, under the second content type in response to a trigger operation for a content type identifier corresponding to the second content type. For example, as shown in 017 in FIG. 12, a search content corresponding to an expression content type may be switched to displaying a search content corresponding to a music content type in response to a trigger operation for a music content type identifier.

In this embodiment, search contents under different content types may be flexibly switched, thereby improving the interaction efficiency.

In some embodiments, source information may further include at least one search content searched by the first content based on search information, where the at least one search content may include a search content corresponding to a first content type of all content types searched by the first client.

Figure 13:
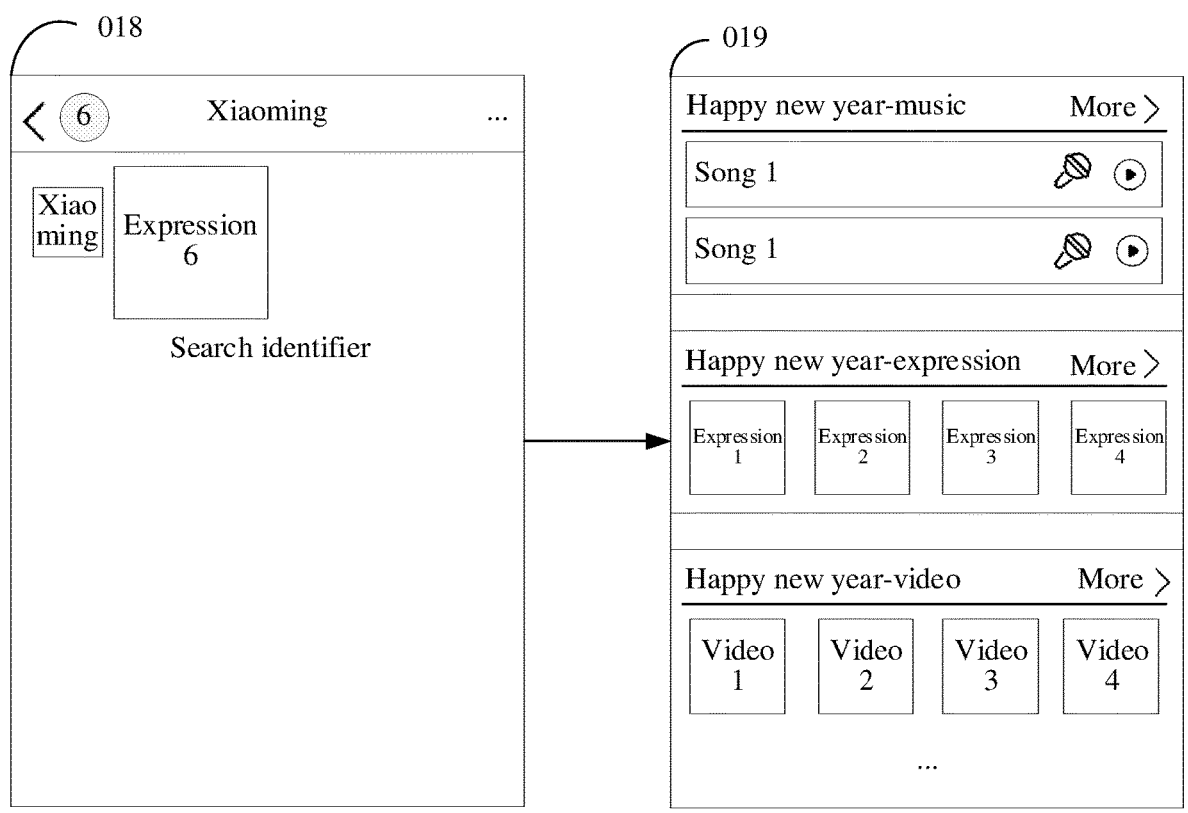
FIG. 13 is a schematic diagram of another scenario of displaying source information of a target search content according to certain embodiment(s) of the present disclosure.

For example, as shown in FIG. 13, a search content 019 corresponding to a first content type of all content types searched by the first client may be displayed in response to a trigger operation for a search identifier in a session page 018.

Figure 14:
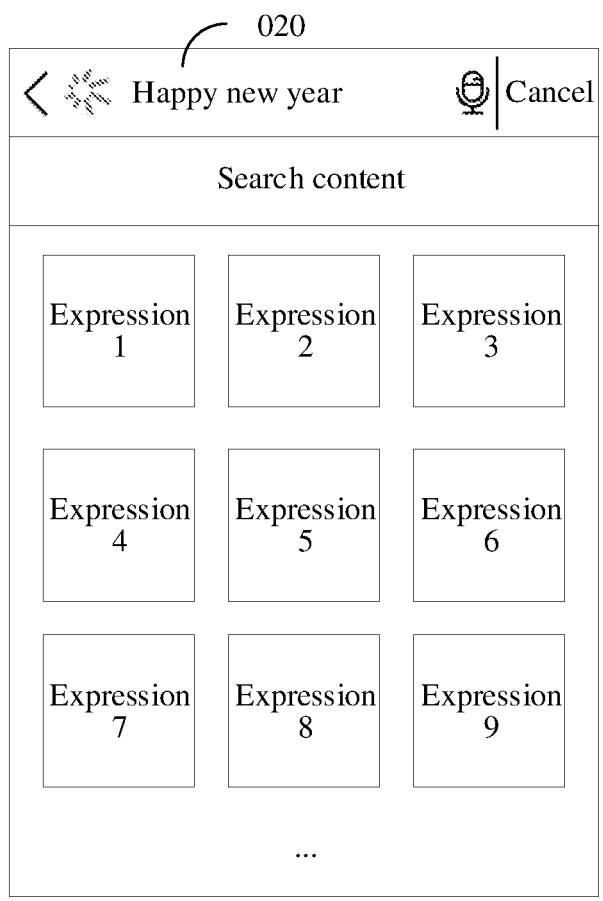
FIG. 14 is a schematic diagram of another scenario of displaying source information of a target search content according to certain embodiment(s) of the present disclosure.

In some embodiments, source information of a target search content may further include search information. For example, the search information may include at least one of a key word, a search image, a search audio and the like. Therefore, in response to the trigger operation for the search identifier, search information may be displayed in addition to displaying the search content. For example, as shown in FIG. 14, the second client may display search information 020 "happy new year" in addition to displaying the search content.

In addition, an object of the second client may further modify the search information. The second search content sharing apparatus may display a search content associated with modified search information in response to a modification operation for the search information.

In certain embodiment(s), a method provided by this embodiment of the present disclosure may further include the following steps:

displaying a search content associated with modified search information in response to a modification operation for the search information.

For example, as shown in FIG. 14, the displayed modification content is "happy new year." In response to that the second object modifies the modification content into "may you be prosperous", the second search content sharing apparatus may display a search content associated with modified search information "may you be prosperous."

In this embodiment, the search information may be switched rapidly in response to the modification operation for the search information so as to rapidly switch the displayed search content, thereby improving the efficiency of switching the search content.

In some embodiments, source information may further include an origin identifier besides a search content, where one search content corresponds to one origin identifier. The origin identifier may be used for identifying origin information of the search content. The origin information of the search content may refer to a content in a page where the search content is located when a search engine searches the search content. For example, when the search content is an expression, and the expression originates from a meme published by a certain creator on a webpage, the origin information corresponding to the search content is the meme. For another example, when the search content is a piece of news and the news originates from news published by a certain creator on a news website, the origin information corresponding to the search content may include a content included in the news website.

In some embodiments, the origin identifier may act as a control, so an object may browse origin information corresponding to a search content by clicking the origin identifier. In certain embodiment(s), a method provided by this embodiment of the present disclosure may further include the following steps:

displaying origin information of a search content corresponding to the origin identifier in response to a trigger operation for the origin identifier.

For example, the source information includes a plurality of expressions related to "happy new year", where each of the expressions has a corresponding origin identifier. When the second object clicks the origin identifier of one of the expressions, a source page corresponding to the expression may be displayed, and the source page may include the source information of the expression. For example, the source page may include other expressions belonging to a same uploader as that of the expression.

In this embodiment, origin information of the search content corresponding to the origin identifier is displayed in response to the trigger operation for the origin identifier, so that the origin information may be inquired rapidly, and the interaction efficiency may be improved.

In some embodiments, to improve the intelligence of content display, search contents included in the source information may be sorted based on attribute information of an object before the source corresponding to the target search content is displayed, so that the displayed search content may conform to the attribute information of the object. For example, at least one search content may include search contents that are sorted based on the attribute of the object corresponding to the second client, so the source information corresponding to the target search content may be displayed in response to a trigger operation for a search identifier.

The attribute information of the object may include operation data in an object client or browsing hobbies in the client.

The search contents in which the object is easily interested may be sorted in the front by sorting the search contents based on the attribute information of the object and displaying the sorted search contents, so that the interaction rate between the object and the search content is increased, and the use sense of the object on the client is improved.

The search contents may be sorted in many ways based on the attribute information of the object. For example, the search contents may be sorted based on the attribute information of the object by an artificial intelligence algorithm.

In this embodiment, since the search contents are sorted based on the attribute information of the object corresponding to the second client, the search content is displayed in a manner suitable for the object of the second client, thereby accelerating the interaction between the object and the search content displayed in the second client, and improving the interaction efficiency.

In some embodiments, when the first client searches the search content based on the search information, search contents associated with search information in different dimensions may be searched.

For example, in response to that the search information is a text, the first client may search contents associated with the search information in a semantic dimension and a word dimension. For example, the search information is "happy new year." The search content associated with "happy new year" in the semantic dimension may include a search content associated with the sentence "happy new year." The search content associated with the search information in the word dimension may include a search content associated with the word "new year."

For another example, in response to that the search information is an image, the first client may search the search contents associated with the search information in the semantic dimension and an image dimension.

In some embodiments, in the second client, the search content may include a search content associated with search information in different dimensions, so the search content associated with the search information in different dimensions may be displayed in response to the trigger operation for the search identifier. In addition, what dimension corresponding to the search content in each dimension may be displayed. For example, in response to that the dimension related to the search content is an image dimension, it may be displayed that the dimension corresponding to the search content is the image dimension.

In this embodiment, since at least one search content includes a search content associated with search information in different dimensions, the richness of the search content is improved.

In some embodiments, to correctly display source information of the target search content in the second client, the first client may fill the target search content, the source information of the target search content and the search identifier into a preset search content description protocol to obtain a target search content description protocol. A message including the target search content description protocol is transmitted to the second client. Therefore, the second client may acquire a search content description protocol corresponding to the target search content so as to correctly display the source information corresponding to the target search content. Then, the source information is displayed based on the search content description protocol.

In certain embodiment(s), the step "displaying the source information corresponding to the target search content in response to a trigger operation for the search identifier" may include:

acquiring the search content description protocol corresponding to the search identifier in response to the trigger operation for the search identifier;

parsing the search content description protocol to obtain search attribute information corresponding to the target search content; and displaying the source information corresponding to the target search content based on the search attribute information.

The search content description protocol may be a protocol for describing information related to the target search content. The search content description protocol has various fields and has extensibility; and the search content description protocol may carry a search identifier. For example, the search content description protocol may be Appmsg. An extensible markup language (XML) text for describing client service data has extensibility with different fields defining different service semantics.

The search content description protocol corresponding to the target search content may refer to a protocol that describes the target search content. For example, the search content description protocol corresponding to the target search content may describe what search engine searches the target search content, what is the identification information of the target search content in the search engine, and what is the content type of the target search content.

The search attribute information may include information that is recorded in the search content description protocol and associated with the target search content. For example, the search attribute information may include what search engine searches the target search content, what is the identification information of the target search content in the search engine, and what is the content type of the target search content. For example, the search attribute information may include search engine identification information and identification information of the target search content.

In some embodiments, the search content description protocol may be parsed to obtain search attribute information corresponding to the target search content. For example, fields in the search content description protocol may be traversed so as to obtain the search attribute information corresponding to the target search content.

In this embodiment, source information is acquired rapidly and correctly by parsing the search content description protocol, so that the efficiency of displaying the source information is improved.

In some embodiments, source information corresponding to the target search content may be displayed based on search attribute information. The source information corresponding to the target search content may be displayed in many ways based on the search attribute information.

For example, the second search content sharing apparatus may receive and display source information transmitted by a server by virtue of the source information corresponding to the target search content searched by the server.

In certain embodiment(s), the step "displaying the source information corresponding to the target search content based on the search attribute information" may include:
  generating a search request based on the search attribute information;
  transmitting the search request to a server such that the server search according to the search request to obtain the source information corresponding to the target search content; and
  receiving and displaying source information transmitted by the server.

For example, the second client may pack the search engine identification information and the identification information of the target search content in the search attribute information to obtain the search request.

Then, the server may initiate a retrieval request to different search engines based on the search request including the search engine identification information and the identification information of the target search content, and receive search results returned by different search engines. Then, the server may integrate the search results returned by different search engines based on the identification information of the target search content to obtain the source information, and return the source information to the second client. Then, the second client may receive and display the source information transmitted by the server.

For another example, the second search content sharing apparatus may initiate retrieval requests to a plurality of different search engines based on the search attribute information, and receive search results returned by different search engines. Then, the second client may integrate the search results returned by different search engines based on the search engine identification information and the identification information of the target search content to obtain and display the source information.

In some embodiments, in response to that the search content corresponding to the first content type is displayed in the second client, the step "displaying the source information corresponding to the target search content in response to a trigger operation for the search identifier, where the source information includes at least one search content searched by the first client based on the search information" may include:
  acquiring the search content description protocol corresponding to the search identifier in response to the trigger operation for the search identifier;
  parsing the search content description protocol to obtain search attribute information and a content type corresponding to the target search content; and
  displaying the search content corresponding to the first content type based on the search attribute information and the content type.

The search content corresponding to the first content type may be displayed in many ways based on the search attribute information and the content type.

In this embodiment, the search content description protocol is parsed, so that the search attribute information and the content type corresponding to the target search content may be obtained rapidly and correctly, and the efficiency of displaying the search content corresponding to the first content type may be improved.

In some embodiments, the second client may receive and display source information transmitted by a server by virtue of source information corresponding to a target search content searched by the server.

For example, the second client may generate a search request based on the search attribute information and the content type, and transmit the search request to the server. For example, the second client may pack the identification information of the target search content in the search attribute information and the content type to obtain the search request.

Then, the second client transmits the search request to the server. After receiving the search request, the server may initiate the retrieval request to different search engines based on the search request including the identification information and the content type of the target search content, and receives search results returned by different search engines.

Then, the server may integrate the search results returned by different search engines based on the identification information and the content type of the target search content to obtain source information, and return the source information to the second client. Then, the second client may receive and display the source information transmitted by the server.

In some embodiments, the second client may display a search content corresponding to a first content type directly based on search attribute information and a content type. In certain embodiment(s), the step "displaying the search content corresponding to the first content type based on the search attribute information and the content type" may include:
  parsing the search attribute information to obtain search engine identification information of at least one search engine;
  transmitting a search request including search information to the at least one search engine based on the search engine identification information, and receiving a search content returned by each search engine; and
  integrating the search content returned by each search engine based on the content type to obtain and display the search content corresponding to the first content type.

A search engine provided by this embodiment of the present disclosure may further include a vertical search engine besides a more routine search engine. The vertical search engine is a professional search engine for a certain industry, which is the subdivision and extension of the search engine. The vertical search engine returns a result to a specific user in a certain form after deeply mining and integrating a certain type of special information in a website (webpage) library based on a specific search request of the user. Vertical search is a new search engine service mode which is put forward relative to a more routine search engine suffering from large information quantity, incorrect inquiry and insufficient depth, and provides information and related service with a special purpose for a specific field, a specific population or a specific demand.

In this embodiment, the search content corresponding to the first content type is acquired rapidly through the search engine identification information obtained by parsing the search attribute information, so that the efficiency of acquiring the search content is improved.

An embodiment of the present disclosure provides a search content sharing method, which may include the following steps: receiving a message transmitted by a first client, where the message includes a target search content, and the target search content is from at least one search content that is searched by the first client and associated with search information; displaying the target search content and a search identifier corresponding to the target search content in a session page of a second client, where the search identifier is used for identifying source information of the target search content; and displaying the source information corresponding to the target search content in response to a trigger operation for the search identifier, where the source information includes the at least one search content searched by the first client based on the search information. The search content may be shared by this embodiment of the present disclosure, so that other objects may acquire the source information of the search content conveniently, and the search efficiency may be improved. By the method provided by this embodiment of the present disclosure, the object of the first client may share and forward the message including the target search content to the object of the second client. After receiving the message, the second client may display the target search content and the search identifier in a session page between the first object and the second object. In response to that the second object wants to acquire the source information of the target search content, the second object may acquire the source information of the target search content conveniently and rapidly by triggering the search identifier. Therefore, by the method provided by this embodiment of the present disclosure, information retrieval related to the shared and forwarded content may be initiated rapidly, thereby improving the search efficiency and meeting the intermediate retrieval desirables of the object.

According to the method described in the embodiments, the following further provides detailed descriptions with examples.

This embodiment of the present disclosure will describe the method of this embodiment of the present disclosure by taking the scenario where a first search content sharing apparatus is integrated on a terminal as an example.

Figure 15:
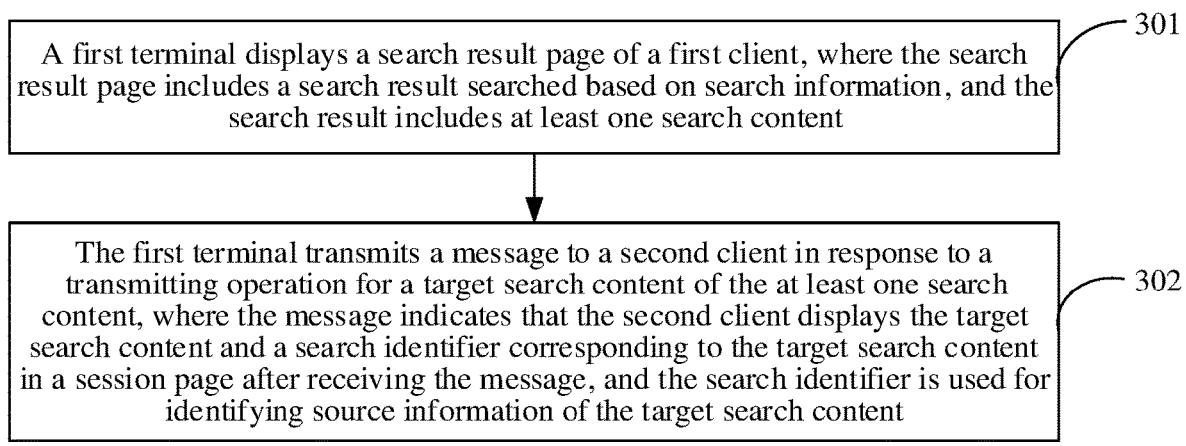
FIG. 15 is another schematic flowchart of a search content sharing method according to certain embodiment(s) of the present disclosure.

In some embodiments, as shown in FIG. 15, a search content sharing method includes the following specific process:

301: displaying, by a first terminal, a search result page of a first client, where the search result page includes a search result searched based on search information, and the search result includes at least one search content.

For example, the first client is an instant messaging client. Xiaoming is an object logging in the first client, so the first client further includes information such as a friend list of Xiaoming.

Figure 16:
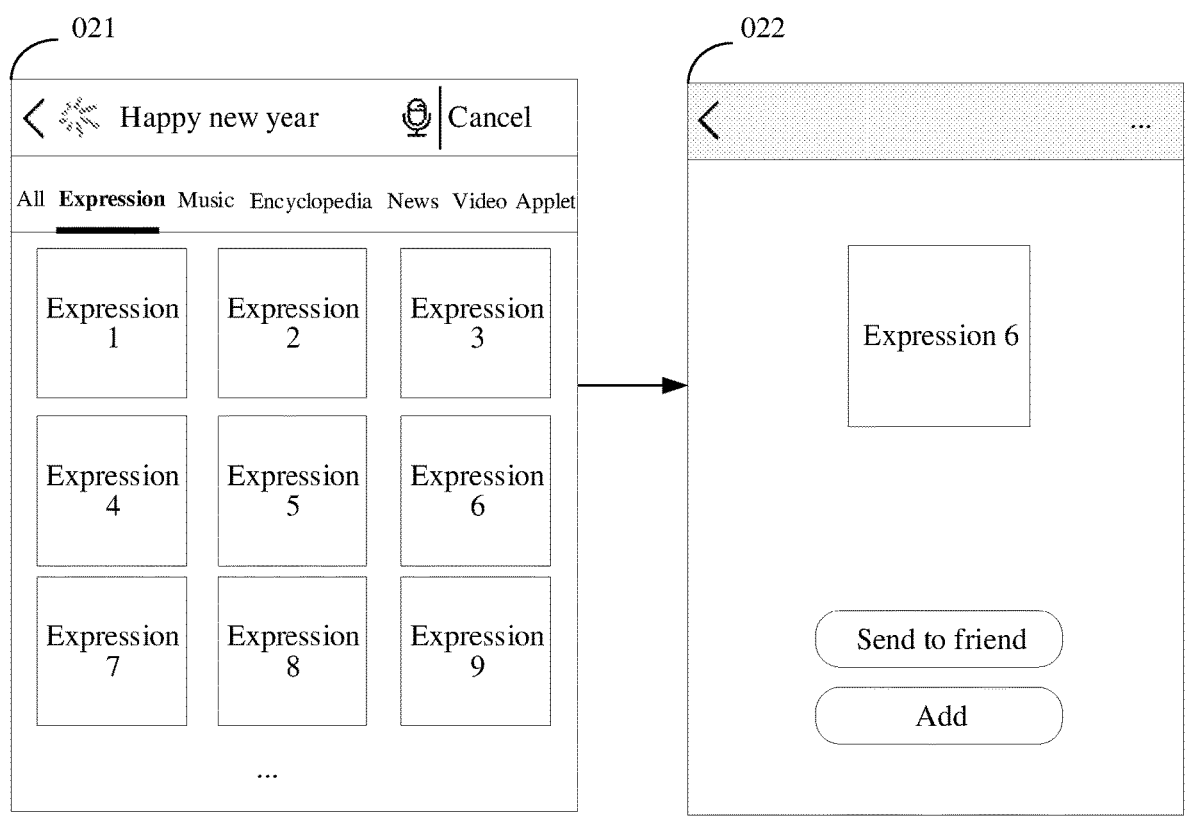
FIG. 16 is a schematic diagram of a scenario of displaying a content confirmation page according to certain embodiment(s) of the present disclosure.

For example, Xiaoming may search a search content related to a search key word "happy new year" by the first client, where Xiaoming wants to browse an expression related to "happy new year." Therefore, the first terminal may display a search result page, where the search result page may include an expression related to "happy new year." For example, as shown in 021 in FIG. 16, an expression related to "happy new year" is displayed.

Then, as shown in 022 in FIG. 16, Xiaoming selects a target search content (that is, an expression 6), and may share the expression 6 with Xiaohong in his friend list.

302: Transmitting, by the first terminal, a message to a second client in response to a transmitting operation for a target search content of the at least one search content, where the message instructs the second client to display the target search content and a search identifier corresponding to the target search content in a session page after receiving the message, and the search identifier is used for identifying source information of the target search content.

Figure 18:
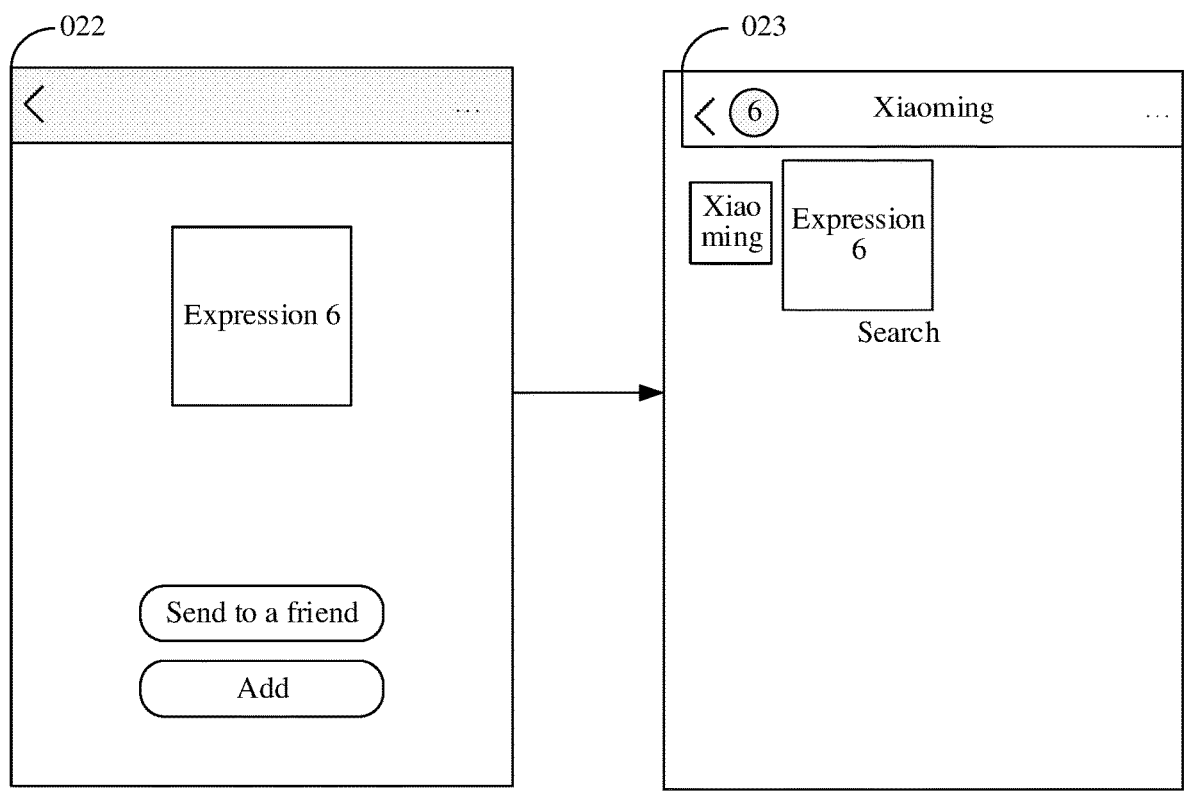
FIG. 18 is a schematic diagram of a scenario of displaying a session page according to certain embodiment(s) of the present disclosure.

For example, after the first object clicks a "send to a friend" control in 022 in FIG. 18 and selects a related single chat or group chat, the target search content will be transmitted to a related session, and a search identifier "search" will be carried at the lower left corner of the target search content.

For example, after Xiaoming clicks the "send to a friend" control in 022 in FIG. 18 and selects the related single chat or group chat, the first terminal will transmit information to the related session, and carry a micro-mark "search" at the lower left corner of the content.

For example, as shown in FIG. 18, after Xiaoming triggers an operation of sharing the expression 6 with Xiaohong in his friend list, the first terminal may transmit a message including information such as the expression 6 to the second client in response to a transmitting operation for the expression 6.

An embodiment of the present disclosure provides a search content sharing method, which may include the following steps: displaying, by a first terminal, a search result page of a first client, where the search result page includes a search result searched based on search information, and the search result includes at least one search content; and transmitting, by the first terminal, a message to a second client in response to a transmitting operation for a target search content of the at least one search content, where the message instructs the second client to display the target search content and a search identifier corresponding to the target search content in a session page after receiving the message, and the search identifier is used for identifying source information of the target search content. The target search content may be shared by this embodiment of the present disclosure, so that other objects may acquire the source information of the search content conveniently, and the search efficiency may be improved.

In addition, this embodiment of the present disclosure will describe the method of this embodiment of the present disclosure by taking the scenario where a second search content sharing apparatus is integrated on a terminal as an example.

Figure 17:
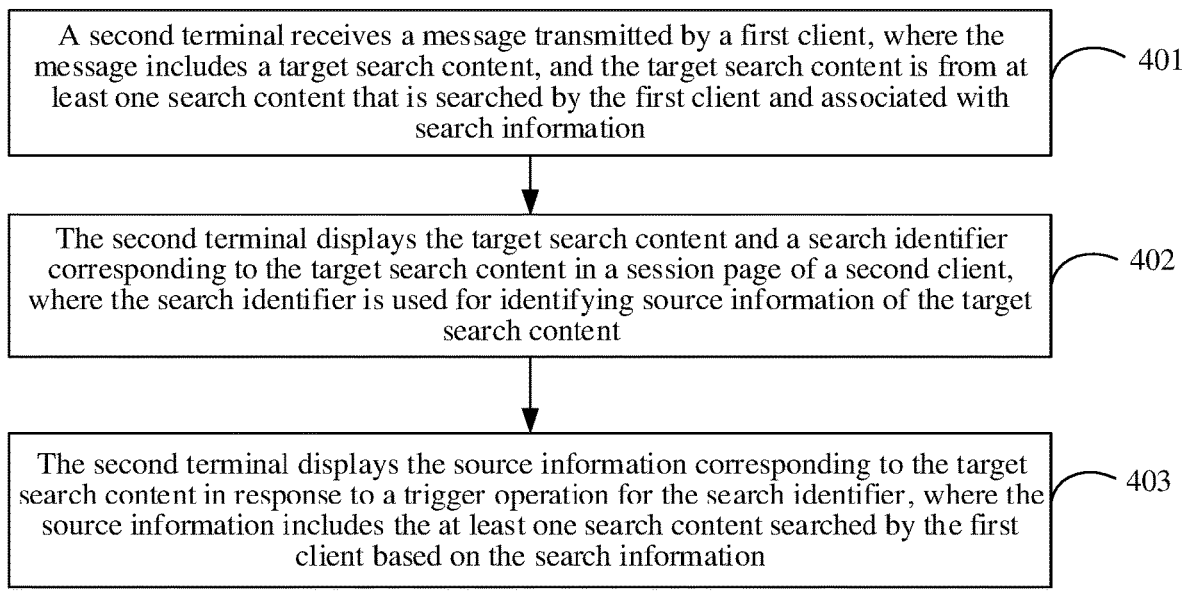
FIG. 17 is another schematic flowchart of a search content sharing method according to certain embodiment(s) of the present disclosure.

In some embodiments, as shown in FIG. 17, a search content sharing method includes the following specific process:

401: receiving, by a second terminal, a message transmitted by a first client, where the message includes a target search content, and the target search content is from at least one search content that is searched by the first client and associated with search information.

402: Displaying, by the second terminal, the target search content and a search identifier corresponding to the target search content in a session page of a second client, where the search identifier is used for identifying source information of the target search content.

For example, after Xiaoming shares the target search content with Xiaohong, Xiaohong may see the target search content and the search identifier corresponding to the target search content through the session page of the second client. For example, as shown in 023 in FIG. 18, Xiaohong may see an expression that is shared with her by Xiaoming through the session page of the second client, where the expression may carry a search identifier "search."

403: Displaying, by the second terminal, the source information corresponding to the target search content in response to a trigger operation for the search identifier, where the source information includes at least one search content searched by the first client based on the search information.

Figure 19:
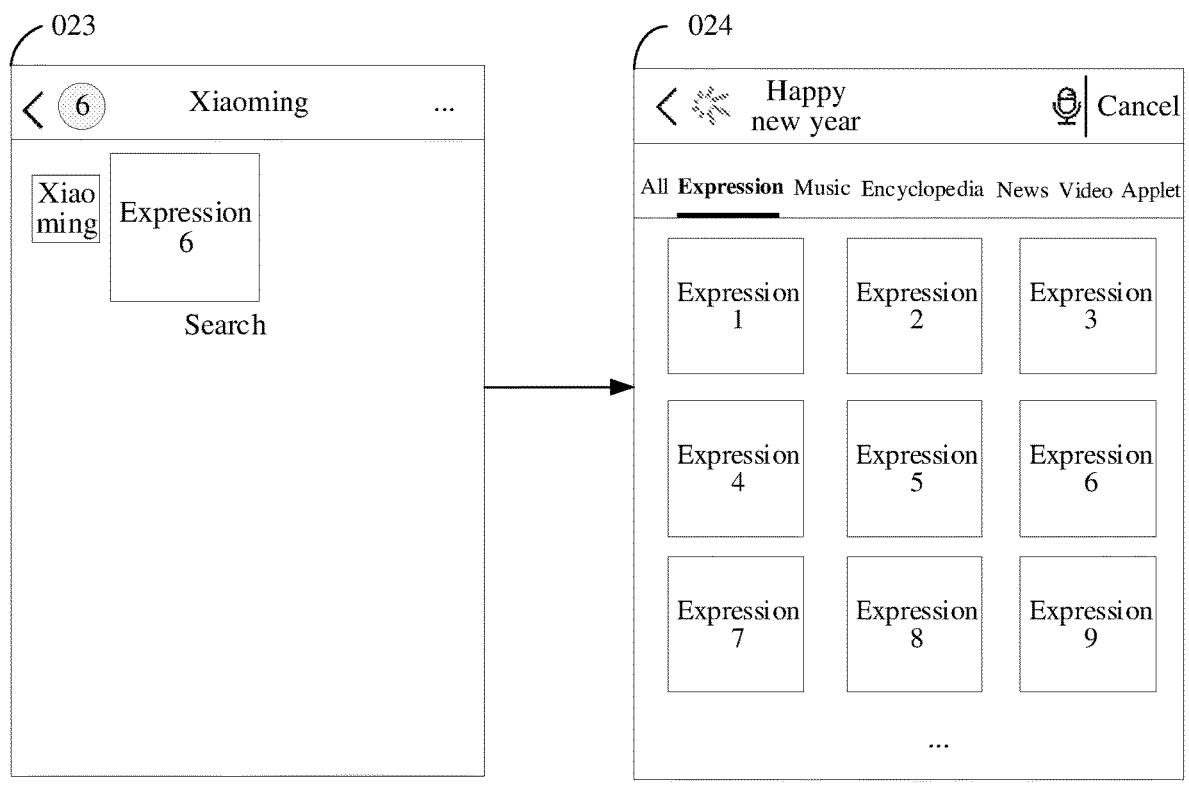
FIG. 19 is a schematic diagram of another scenario of displaying source information of a target search content according to certain embodiment(s) of the present disclosure.

Then, Xiaohong may display on the second client a search result page of the target search content in the first client conveniently by clicking a search mark "search", and rapidly initiate a secondary search related to the target search content. For example, as shown in 024 in FIG. 19, the searched page is displayed by clicking the search mark "search."

An embodiment of the present disclosure provides a search content sharing method, which may include the following steps: receiving, by a second terminal, a message transmitted by a first client, where the message includes a target search content, and the target search content is from a target search content of at least one search content that is searched by the first client and associated with search information; displaying, by the second terminal, the target search content and a search identifier corresponding to the target search content in a session page of a second client, where the search identifier is used for identifying source information of the target search content; and displaying, by the second terminal, the source information corresponding to the target search content in response to a trigger operation for the search identifier, where the source information includes at least one search content searched by the first client based on the search information. The target search content may be shared by this embodiment of the present disclosure, so that other objects may acquire the source information of the target search content conveniently, and the search efficiency may be improved.

In addition, this embodiment of the present disclosure describes the method of this embodiment of the present disclosure by taking the scenario where the first search content sharing apparatus is integrated on the first terminal, the second search content sharing apparatus is integrated on the second terminal and the message transmission apparatus may be integrated on the server as an example.

Figure 20:
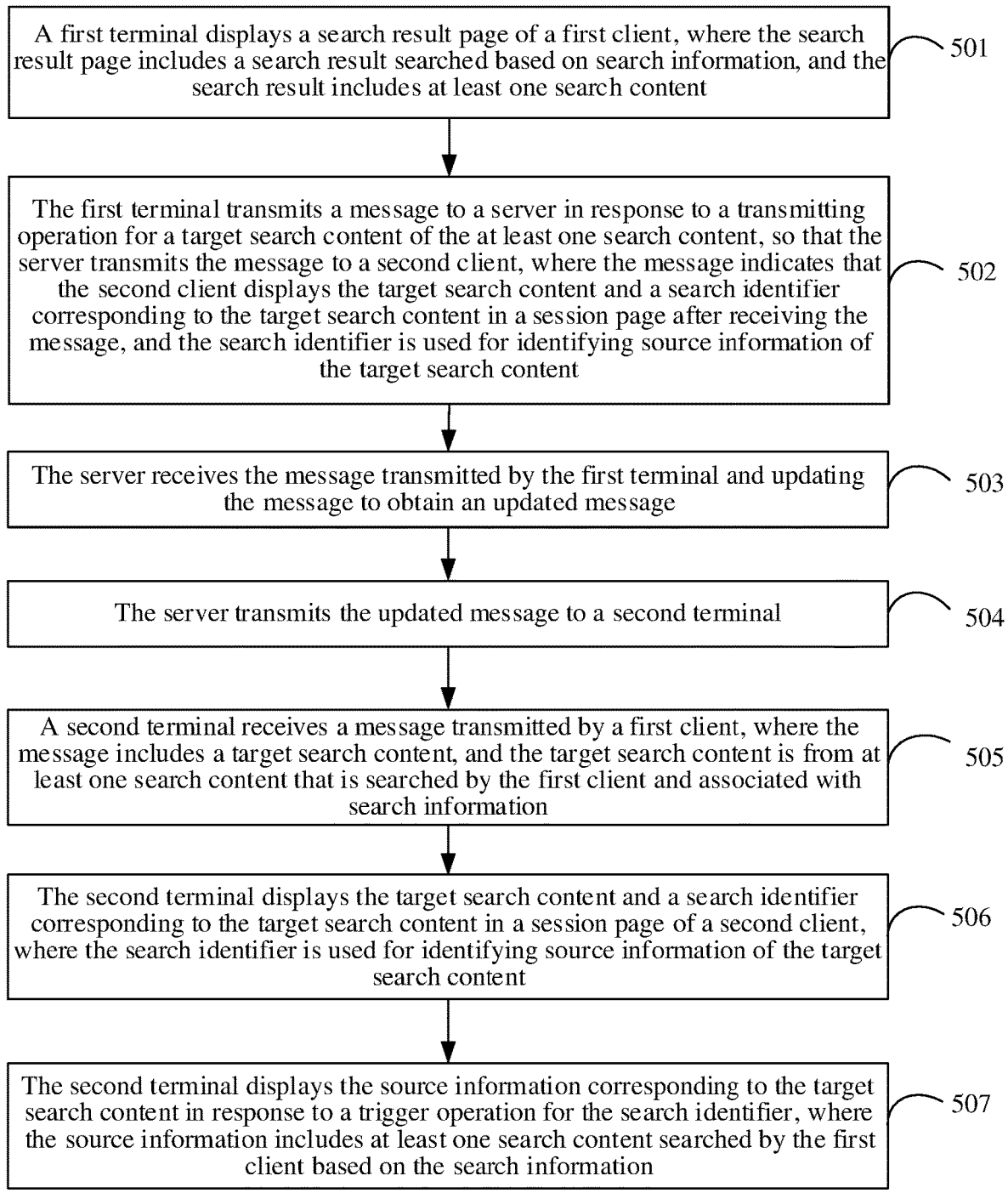
FIG. 20 is another schematic flowchart of a search content sharing method according to certain embodiment(s) of the present disclosure.

In some embodiments, as shown in FIG. 20, a search content sharing method includes the following specific process:

501: displaying, by a first terminal, a search result page of a first client, where the search result page includes a search result searched based on search information, and the search result includes at least one search content.

502: Transmitting, by the first terminal, a message to a server in response to a transmitting operation for a target search content of at least one search content, so that the server transmits the message to a second client, where the message instructs the second client to display a target search content and a search identifier corresponding to the target search content in a session page after receiving the message, and the search identifier is used for identifying source information of the target search content.

For example, Xiaoming wants to transmit the target search content to Xiaohong, and the first terminal may pack identification information (equivalent to docid) corresponding to the target search content, a content type of the target search content, and an object identifier corresponding to Xiaohong to obtain a message, and transmit the message to the server.

503: Receiving, by a server, the message transmitted by the first terminal and updating the message to obtain an updated message.

After the server receives the message that Xiaoming wants to share and which is transmitted by the first terminal, the client may generate corresponding AppMsg according to docid and the content type of the target search content, where Appmsg includes micro-mark information "search." Then, the server may update the message based on AppMsg to obtain an updated message.

504: Transmitting, by the server, the updated message to a second terminal.

505: Receiving, by a second terminal, a message transmitted by a first client, where the message includes a target search content, and the target search content is from at least one search content that is searched by the first client and associated with search information.

506: Displaying, by the second terminal, the target search content and a search identifier corresponding to the target search content in a session page of a second client, where the search identifier is used for identifying source information of the target search content.

507: Displaying, by the second terminal, the source information corresponding to the target search content in response to a trigger operation for the search identifier, where the source information includes at least one search content searched by the first client based on the search information.

For example, after Xiaohong clicks the search mark "search" of Appmsg in the session page, the second client may parse Appmsg, obtain docid and the content type of the target search content, pack the search information, docid and the content type of the target search content, and transmits a search request to the server.

Then, the server initiates a retrieval request to a related vertical search engine (such as expression search, applet search, official account search, music search and news search) according to the content type (such as an expression content type) and search information (such as "happy new year") corresponding to the target search content.

The server returns the retrieved source information of the target search content to the second client, and the second client displays the source information to Xiaohong through the second client.

The target search content may be shared by this embodiment of the present disclosure, so that other objects may acquire the source information of the search content conveniently, and the search efficiency may be improved.

To better implement the search content sharing method provided by this embodiment of the present disclosure, in some embodiments, a search content sharing system is further provided. The search content sharing system may include a search content sharing apparatus suitable for a first client (which may be referred to as a first search content sharing apparatus) and a search content sharing apparatus suitable for a second client (which may be referred to as a second search content sharing apparatus). The first search content sharing apparatus and a second search content client may be integrated in a computing device. The meanings of nouns are the same as those in the search content sharing method. For specific implementation details, refer to the description in the method embodiments.

Figure 21:
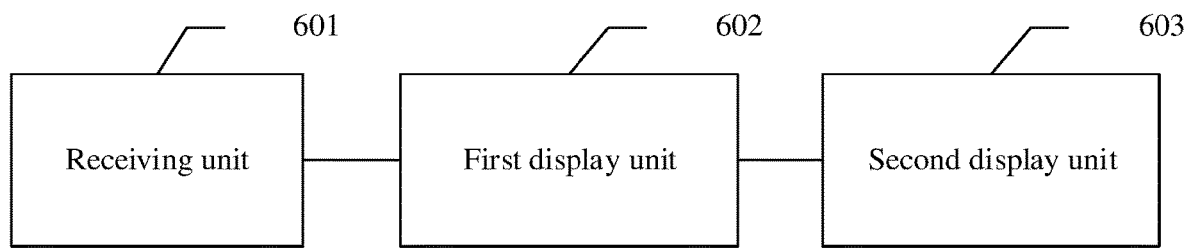
FIG. 21 is a schematic structural diagram of a second search content sharing apparatus according to certain embodiment(s) of the present disclosure.

In some embodiments, a second search content sharing apparatus is provided. The second search content sharing apparatus may be integrated in a computing device. As shown in FIG. 21, the search content sharing apparatus includes: a receiving unit 601, a first display unit 602 and a second display unit 603, where:
  the receiving unit 601 is configured to receive a message transmitted by a first client, where the message includes a target search content, and the target search content is from at least one search content that is searched by the first client and associated with search information;
  the first display unit 602 is configured to display the target search content and a search identifier corresponding to the target search content in a session page of the second client, where the search identifier is used for identifying source information of the target search content; and
  the second display unit 603 is configured to display the source information corresponding to the target search content in response to a trigger operation for the search identifier, where the source information includes at least one search content searched by the first client based on the search information.

In some embodiments, the second display unit 603 may include:
  a first display subunit, configured to display a search content corresponding to a first content type in response to a trigger operation for a search identifier.

In some embodiments, the second display unit 603 may further include:
  a second display subunit, configured to switch to displaying a search content, associated with the search information, under a second content type in response to a content switching operation.

In some embodiments, the first display subunit may include:
  a first display module, configured to display a search content page in response to the trigger operation for the search identifier, where the search content page includes the search content corresponding to the first content type and at least one content type identifier, where one content type identifier corresponds to one content type of search contents.

In some embodiments, the second display subunit may include:
  switching to displaying the search content, associated with the search information, under the second content type in response to a trigger operation for a content type identifier corresponding to the second content type.

In some embodiments, the second display unit 603 may further include:
  a first acquiring subunit, configured to acquire a search content description protocol corresponding to a search identifier in response to a trigger operation for the search identifier;
  a first parsing subunit, configured to parse the search content description protocol to obtain search attribute information and a content type corresponding to the target search content; and
  a third display subunit, configured to display the search content corresponding to the first content type based on the search attribute information and the content type.

In some embodiments, the third display subunit may include:
  a first parsing module, configured to parse the search attribute information to obtain search engine identification information of at least one search engine;
  a first transmitting module, configured to transmit a search request including search information to the at least one search engine based on the search engine identification information, and receive a search content returned by each search engine; and
  an integration module, configured to integrate the search content returned by each search engine based on the content type to obtain and display the search content corresponding to the first content type.

In some embodiments, the search content sharing apparatus may further include:
  a fourth display unit, configured to display a search content associated with modified search information in response to a modification operation for the search information.

In some embodiments, the second display unit 603 may further include:
  a second acquiring subunit, configured to acquire a search content description protocol corresponding to a search identifier in response to a trigger operation for the search identifier;
  a second parsing subunit, configured to parse the search content description protocol to obtain search attribute information corresponding to the target search content; and
  a fourth display subunit, configured to display the source information corresponding to the target search content based on the search attribute information.

In some embodiments, the fourth display subunit may further include:
  a generation module, configured to generate a search request based on the search attribute information;
  a second transmitting module, configured to transmit the search request to a server such that the server search according to the search request to obtain the source information corresponding to the target search content; and
  a first receiving module, configured to receive and display source information transmitted by the server.

Figure 22:
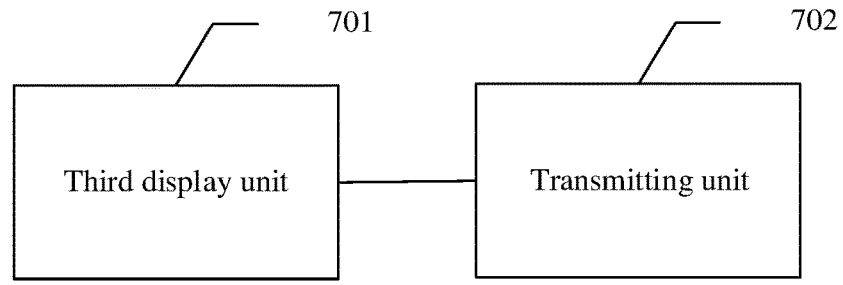
FIG. 22 is a schematic structural diagram of a first search content sharing apparatus according to certain embodiment(s) of the present disclosure.

In some embodiments, a first search content sharing apparatus is provided. The first search content sharing apparatus may be integrated in a computing device. As shown in FIG. 22, the search content sharing apparatus includes: a third display unit 701 and a transmitting unit 702, where:
  the third display unit 701 is configured to display a search result page of a first client, where the search result page includes a search result searched based on search information, and the search result includes at least one search content; and
  the transmitting unit 702 is configured to transmit a message to a second client in response to a transmitting operation for a target search content of the at least one search content, where the message instructs the second client to display the target search content and a search identifier corresponding to the target search content in a session page after receiving the message, and the search identifier is used for identifying source information of the target search content.

In some embodiments, the third display unit 701 may include:

a fifth display subunit, configured to display a search content corresponding to a target content type in response to a trigger operation for a target content type identifier, where the target content type is a content type corresponding to the target search content.

In some embodiments, the transmitting unit 702 may include:

a first generation subunit, configured to generate search attribute information of the target search content in response to the transmitting operation for the target search content of the at least one search content;

a filling subunit, configured to fill the search attribute information and the content type of the target search content into a preset search content description protocol to obtain a target search content description protocol; and a first transmitting subunit, configured to transmit a message including the target search content description protocol to the second client.

In some embodiments, the transmitting unit 702 may further include:

a sixth display subunit, configured to display a content confirmation page in response to a selection operation for at least one search content, where the content confirmation page includes a target search content; and a second transmitting subunit, configured to transmit a target search content in the content confirmation page to the second client in response to a transmitting operation for the content confirmation page.

In some embodiments, the transmitting unit 702 may include:

a seventh display subunit, configured to display a transmission object selection page in response to the transmitting operation for the target search content, where the transmission object selection page includes at least one project object, and the project object has an association relationship with a first object of the first client; and a third transmitting subunit, configured to transmit the message to the target object in the second client in response to a selection operation for the target object of the at least one project object.

In some embodiments, the third transmitting subunit may include:

a first identification module, configured to identify the target object in response to the selection operation for the target object to obtain an object identifier of the target object;

a second generation module, configured to generate search attribute information of the target search content based on the target search content;

a packing module, configured to pack the target search content, the search attribute information of the target search content, and the object identifier of the target object to obtain the message; and a second transmitting module, configured to transmit the message to a server such that the server forwards the message to the second client.

In some embodiments, the second generation module may include:

an information extraction submodule, configured to perform information extraction on a search result to obtain search engine identification information corresponding to the search result;

an identification submodule, configured to identify the target search content to obtain identification information of the target search content in the search result; and a packaging submodule, configured to package the search engine identification information, the identification information and search information corresponding to the target search content to obtain the search attribute information.

During specific implementation, each of the units may be implemented as an independent entity; or may be randomly combined, so as to be implemented as a same entity or several entities. For specific implementations of the units, refer to the method embodiments.

The target search content may be shared by the search content sharing apparatus, so that other objects may acquire the source information of the target search content conveniently, and the search efficiency may be improved.

Figure 23:
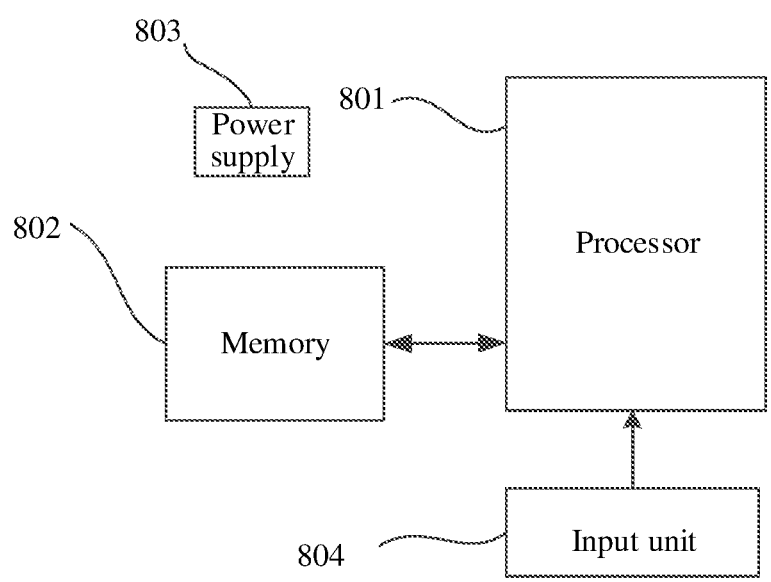
FIG. 23 is a schematic structural diagram of a computing device according to certain embodiment(s) of the present disclosure.

Embodiments of the present disclosure further provide a computing device. The computing device may include a terminal or a server. For example, the computing device may serve as a search content sharing terminal. The terminal may be a mobile phone, a tablet personal computer and the like. For another example, the computing device may be a server, such as a search content sharing server. As shown in FIG. 23, a schematic structural diagram of a terminal according to an embodiment of the present disclosure is shown.

The computing device may include components such as a processor 801 of one or more processing cores, a memory 802 of one or more computer-readable storage media, a power supply 803, and an input unit 804. It is to be understood by those skilled in the art that, a structure of the computing device shown in FIG. 23 does not constitute a limitation on the computing device, and may include more or fewer components than those shown in the figure, or a combination of some components, or different component arrangements, where the processor 801 is a control center of the computing device connected to various parts of the entire computing device by using various interfaces and lines, and performs various functions and data processing of the computing device by running or executing software programs and/or modules stored in the memory 802 and invoking data stored in the memory 802. In certain embodiment(s), the processor 801 may include one or more processing cores. In certain embodiment(s), the processor 801 may integrate an application processor and a modem processor. The application processor processes an operating system, a user interface, an application program, and the like. The modem processor processes wireless communication. It may be understood that the modem processor may either not be integrated in the processor 801.

The memory 802 may be configured to store a software program and module. The processor 801 runs the software program and module stored in the memory 802, thereby performing various functional applications and data processing. The memory 802 may include a program storage area and a data storage area. The program storage area may store an operating system, an application program desired by at least one function (for example, a sound playing function and an image playing function), or the like. The data storage area may store data created according to use of the computing device. In addition, the memory 802 may include a high speed random access memory, and may further include a non-volatile memory, such as at least one magnetic disk storage device, a flash memory, or other volatile solid-state storage devices. Correspondingly, the memory 802 may further include a memory controller to provide access of the processor 801 to the memory 802.

The computing device further includes the power supply 803 for supplying power to the components. In certain embodiment(s), the power supply 803 may be logically connected to the processor 801 through a power supply management system so as to implement a function of managing charge, discharge, power consumption, and the like through the power supply management system. The power supply 803 may further include one or more of a direct-current or alternating-current power supply, a recharging system, a power failure detection circuit, a power supply converter or inverter, a power supply state indicator, and any other components.

The computing device may further include an input unit 804. The input unit 804 may be configured to receive entered numeric or character information and generate a keyboard, mouse, joystick, optical, or trackball signal input related to user settings and function control.

Although not shown in the figure, the computing device may further include a display unit. In certain embodiment(s), the processor 801 in the computing device may load executable files corresponding to processes of one or more application programs into the memory 802 according to the following instruction. The processor 801 runs the application programs stored in the memory 802 so as to implement the steps in the search content sharing method.

A computing device includes a memory and one or more processors, where the memory has a computer-readable instruction stored thereon that when executed by the one or more processors, causing the one or more processors to perform the steps in the search content sharing method.

According to one aspect of the present disclosure, a computer program product is provided. The computer program product includes a computer instruction, and the computer instruction is stored in a computer-readable storage medium. A processor of a computing device reads the computer instruction from the computer-readable storage medium, and executes the computer instruction to cause the computing device to perform the method provided in the various alternative implementations in the embodiments.

A computer program includes a computer-readable instruction that when executed by a processor, causing the steps in the search content sharing method to be implemented.

Those of ordinary skill in the art may understand that, all or some steps of the methods in the embodiments may be implemented by the computer-readable instruction, or implemented through the computer-readable instruction controlling relevant hardware, and the computer-readable instruction may be stored in a computer-readable memory storage medium and loaded and executed by a processor.

One or more non-volatile readable storage media has a computer-readable instruction stored thereon that when executed by one or more processors, causing the one or more processors to implement the steps in the search content sharing method.

Accordingly, an embodiment of the present disclosure further provides a storage medium, storing a computer-readable instruction. The computer-readable instruction may be loaded by a processor to perform the steps in any search content sharing method according to the embodiments of the present disclosure. For example, the computer-readable instruction may perform the steps in the search content sharing method.

Since the computer-readable instruction stored in the storage medium may perform the steps in any search content sharing method in the embodiments of the present disclosure, the beneficial effects that may be achieved by any search content sharing method provided by the embodiments of the present disclosure may be achieved, referring to the embodiments for details.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit may be implemented using one or more processors (or processors and memory) Likewise, a processor (or processors and memory) may be used to implement one or more units. Moreover, each unit may be part of an overall unit that includes the functionalities of the unit.

A search content sharing method and apparatus, computing device and storage medium provided in the embodiments of the present disclosure are described in detail. The principle and implementation of the present disclosure are illustrated by applying specific examples herein. The description of the embodiments is only used to help understand the method and its core idea of the present disclosure. Those skilled in the art may make modifications to the specific implementations scopes according to the ideas of the present disclosure. The content of the present disclosure is not to be construed as a limitation to the present disclosure.

What is claimed is:

1. A search content sharing method, performed by a computing device, the method comprising:
    receiving a message transmitted by a first client, the message including a target search content, and the target search content being from at least one search content that is searched by the first client and associated with search information;
    displaying, by a second client executed on the computing device, a session page of the second client, the session page including a messaging interface showing chat messages between a first user of the first client and a second user of the second client;
    determining whether the message includes a search identifier display mark, wherein the search identifier display mark is added in the message by the first client in response to the first user and the second user having a type of associated relationship;
    in response to the message including the search identifier display mark:
        displaying the target search content and a search identifier corresponding to the target search content in the session page of the second client, the search identifier being a triggerable control shown as a search icon, wherein the triggerable control and the target search content are presented together as a message received from the first client that searched the target search content in the messaging interface of the second client; and
        displaying, by the second client, source information corresponding to the target search content in response to a trigger operation for the search identifier on the session page of the second client, the source information comprising the at least one search content searched by the first client based on the search information; and in response to the message not including the search identifier display mark, displaying the target search content in the session page of the second client as a message received from the first client without displaying the search identifier.

2. The method according to claim 1, wherein the at least one search content includes a search content corresponding to a first content type of a plurality of content types searched by the first client.

3. The method according to claim 2, wherein displaying the source information comprises:

displaying the search content corresponding to the first content type in response to the trigger operation for the search identifier; and the method further comprises: switching to displaying a search content, associated with the search information, under a second content type in response to a content switching operation.

4. The method according to claim 3, wherein displaying the search content comprises:

displaying a search content page in response to the trigger operation for the search identifier, the search content page comprising the search content corresponding to the first content type and at least one content type identifier, one content type identifier corresponding to one content type of search contents; and the switching to displaying a search content, associated with the search information, under a second content type in response to a content switching operation comprises:

switching to displaying the search content, associated with the search information, under the second content type in response to a trigger operation for a content type identifier corresponding to the second content type.

5. The method according to claim 2, wherein displaying the source information comprises:

acquiring a search content description protocol corresponding to the search identifier in response to the trigger operation for the search identifier;

parsing the search content description protocol to obtain search attribute information and a content type corresponding to the target search content; and displaying the search content corresponding to the first content type based on the search attribute information and the content type.

6. The method according to claim 5, wherein displaying the search content comprises:

parsing the search attribute information to obtain search engine identification information of at least one search engine;

transmitting a search request comprising the search information to the at least one search engine based on the search engine identification information, and receiving a search content returned by each search engine; and integrating the search content returned by each search engine based on the content type to obtain and display the search content corresponding to the first content type.

7. The method according to claim 1, wherein the source information further includes the search information; and the method further comprises:

displaying a search content associated with modified search information in response to a modification operation for the search information.

8. The method according to claim 1, wherein the source information further includes an origin identifier, one search content corresponding to one origin identifier; and the method further comprises: displaying origin information of a search content corresponding to the origin identifier in response to a trigger operation for the origin identifier.

9. The method according to claim 1, wherein the at least one search content includes a search content sorted based on attribute information of an object corresponding to the second client.

10. The method according to claim 1, wherein the at least one search content includes a search content associated with the search information in different dimensions.

11. The method according to claim 1, wherein displaying the source information comprises:

acquiring a search content description protocol corresponding to the search identifier in response to the trigger operation for the search identifier;

parsing the search content description protocol to obtain search attribute information corresponding to the target search content; and displaying the source information corresponding to the target search content based on the search attribute information.

12. The method according to claim 11, wherein displaying the source information comprises:

generating a search request based on the search attribute information;

transmitting the search request to a server such that the server searches according to the search request to obtain the source information corresponding to the target search content; and receiving and displaying the source information transmitted by the server.

13. The method according to claim 1, further comprising:

parsing the message to obtain an object identifier corresponding to the target search content;

determining a target object in the second client based on the object identifier; and displaying a session page for the target object in the second client.

14. The method according to claim 1, wherein the messaging interface is for a group chat whose members including the first user, the second user, and a third user, the search identifier display mark is not added in the message by the first client in response to the first user not having the type of associated relationship with the third user in the group chat, and the method further comprises: in response to the message not including the search identifier display mark and the first user and the second user having the type of associated relationship, displaying the target search content in the session page of the second client as the message received from the first client without displaying the search identifier.

15. The method according to claim 1, wherein the type of association relationship is one of a friend relationship, a frequent interaction relationship, a like relationship, a message relationship, and a comment relationship.

16. The method according to claim 1, wherein the type of association relationship is a friend relationship.

17. A search content sharing apparatus, comprising: a memory storing computer program instructions; and a processor coupled to the memory and configured to execute the computer program instructions and perform:

receiving a message transmitted by a first client, the message including a target search content, and the target search content being from at least one search content that is searched by the first client and associated with search information;

displaying, by a second client executed by the processor, a session page of the second client, the session page including a messaging interface showing chat messages between a first user of the first client and a second user of the second client;

determining whether the message includes a search identifier display mark, wherein the search identifier display mark is added in the message by the first client in response to the first user and the second user having a type of associated relationship;

in response to the message including the search identifier display mark:
  displaying the target search content and a search identifier corresponding to the target search content in the session page of the second client, the search identifier being a triggerable control shown as a search icon, wherein the triggerable control and the target search content are presented together as a message received from the first client that searched the target search content in the messaging interface of the second client; and
  displaying, by the second client, source information corresponding to the target search content in response to a trigger operation for the search identifier on the session page of the second client, the source information comprising the at least one search content searched by the first client based on the search information; and in response to the message not including the search identifier display mark, displaying the target search content in the session page of the second client as a message received from the first client without displaying the search identifier.

18. A non-transitory computer readable storage medium, storing computer instructions, the computer instructions, when executed by at least one processor, causing the at least one processor to perform:

receiving a message transmitted by a first client, the message including a target search content, and the target search content being from at least one search content that is searched by the first client and associated with search information;

displaying, by a second client executed by the at least one processor, a session page of the second client, the session page including a messaging interface showing chat messages between a first user of the first client and a second user of the second client;

determining whether the message includes a search identifier display mark, wherein the search identifier display mark is added in the message by the first client in response to the first user and the second user having a type of associated relationship;

in response to the message including the search identifier display mark:
  displaying the target search content and a search identifier corresponding to the target search content in the session page of the second client, the search identifier being a triggerable control shown as a search icon, wherein the triggerable control and the target search content are presented together as a message received from the first client that searched the target search content in the messaging interface of the second client; and
  displaying, by the second client, source information corresponding to the target search content in response to a trigger operation for the search identifier on the session page of the second client, the source information comprising the at least one search content searched by the first client based on the search information; and in response to the message not including the search identifier display mark, displaying the target search content in the session page of the second client as a message received from the first client without displaying the search identifier.

\* \* \* \* \*